(12) United States Patent
Tanaka

(10) Patent No.: US 10,317,880 B2
(45) Date of Patent: Jun. 11, 2019

(54) PRINT DATA DIVIDING APPARATUS, AND RELATED PROGRAM AND RECORDING MEDIUM, THAT DETERMINE A SHAPE OF A JOINT PORTION OF A TARGET AREA AND GENERATE THREE-DIMENSIONAL SHAPE DATA FOR DIVISION PRINTING OF THE TARGET AREA

(71) Applicant: CANON KABUSHIKI KAISHA, Tokyo (JP)

(72) Inventor: Shuya Tanaka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 468 days.

(21) Appl. No.: 14/957,925

(22) Filed: Dec. 3, 2015

(65) Prior Publication Data

US 2016/0185049 A1 Jun. 30, 2016

(30) Foreign Application Priority Data

Dec. 25, 2014 (JP) ................................ 2014-262690

(51) Int. Cl.
*B29C 67/00* (2017.01)
*G05B 19/4099* (2006.01)
*B33Y 50/00* (2015.01)

(52) U.S. Cl.
CPC .......... *G05B 19/4099* (2013.01); *B33Y 50/00* (2014.12); *G05B 2219/35134* (2013.01); *G05B 2219/49007* (2013.01); *Y02P 90/265* (2015.11)

(58) Field of Classification Search
CPC ......... B33Y 50/00; B33Y 10/00; B33Y 30/00; B33Y 80/00; G05B 19/4099; G05B 2219/35134; G05B 2219/49007; G05B 2219/45238; Y02P 90/265; B29C 70/382
USPC ................... 700/97, 118, 187, 103, 131, 262
See application file for complete search history.

(56) References Cited

U.S. PATENT DOCUMENTS

| | | | |
|---|---|---|---|
| 2008/0195216 A1* | 8/2008 | Philipp | A61F 2/30756 623/18.11 |
| 2014/0340457 A1* | 11/2014 | Hashimoto | G03G 21/0011 347/118 |
| 2015/0134095 A1* | 5/2015 | Hemani | G06T 19/00 700/98 |

FOREIGN PATENT DOCUMENTS

JP H11-216273 A 8/1999

* cited by examiner

*Primary Examiner* — Shahed Ahmed
(74) *Attorney, Agent, or Firm* — Venable LLP

(57) ABSTRACT

A print data dividing apparatus includes a dividing unit configured to divide three-dimensional (3D) image data, having image information and distance information, into a plurality of areas, a determining unit configured to determine a kind of a shape of a joint surface of a target area, among the plurality of areas, on the basis of a position of the target area and a thickness of the target area, such that the shape has a concave/convex portion, and the joint surface is fitted to another joint surface of another area, of the plurality of areas, that is adjacent to the target area, and a generating unit configured to generate 3D shape data for division printing of the target area in which a joint portion, corresponding to the determined kind of joint surface has been provided for the joint surface.

10 Claims, 12 Drawing Sheets

| FIG. 3A |
| FIG. 3B |
| FIG. 3C |
| FIG. 3D |

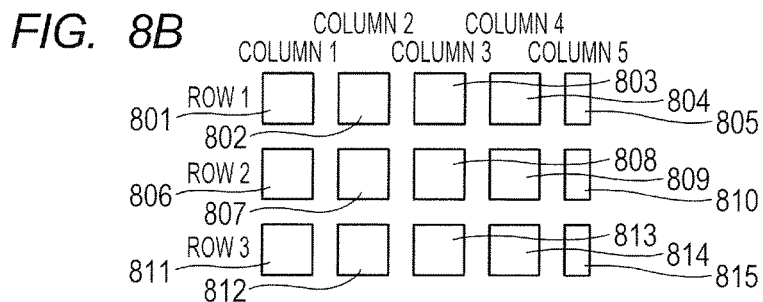
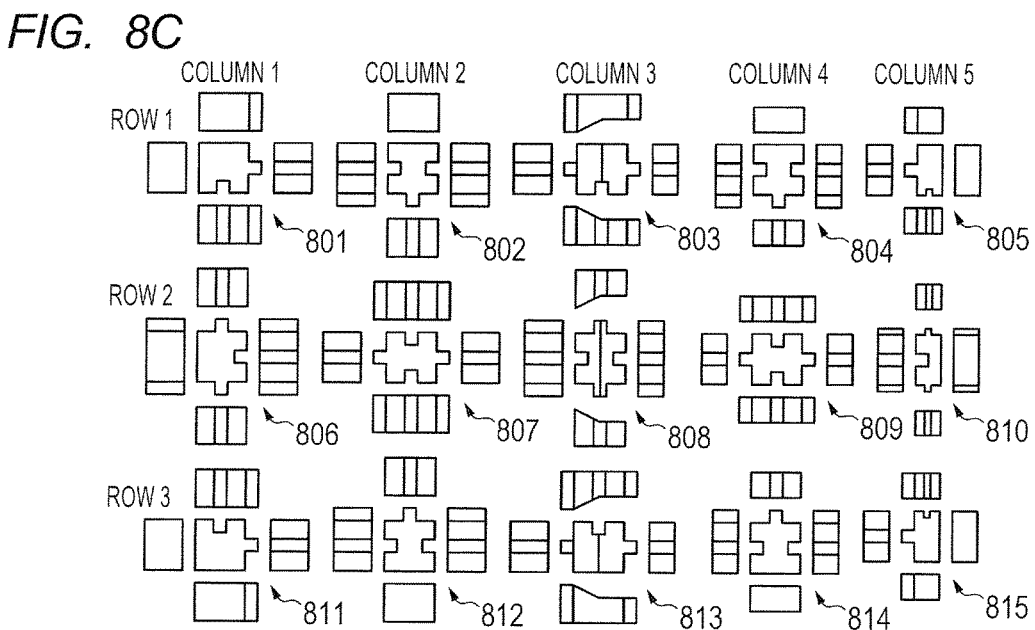
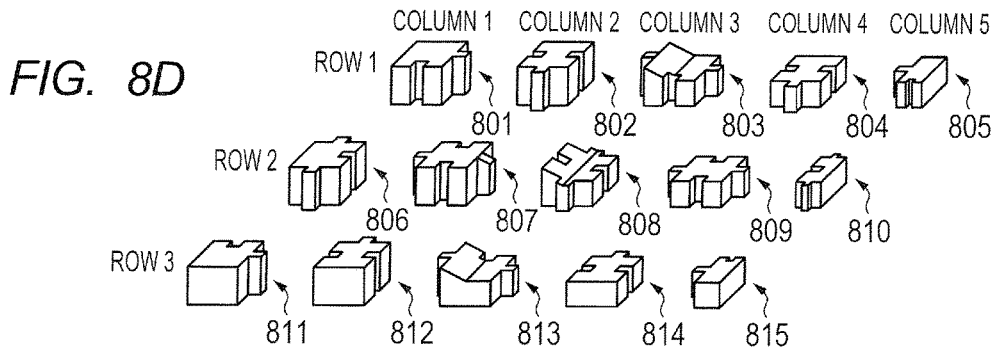

PRINT DATA DIVIDING APPARATUS, AND RELATED PROGRAM AND RECORDING MEDIUM, THAT DETERMINE A SHAPE OF A JOINT PORTION OF A TARGET AREA AND GENERATE THREE-DIMENSIONAL SHAPE DATA FOR DIVISION PRINTING OF THE TARGET AREA

This application claims the benefit of Japanese Patent Application No. 2014-262690, filed Dec. 25, 2014, which is hereby incorporated by reference herein in its entirety.

BACKGROUND OF THE INVENTION

Field of the Invention

The present invention relates to a print data dividing apparatus, a program for dividing print data into a plurality of areas and printing the divided print data, and to a recording medium in which such a program has been recorded.

Description of the Related Art

A method of manufacturing a model, in which a first portion and a second portion of the model are molded based on three-dimensional (3D) shape data, and the molded first and second portions are united by mutually joining them has been known. Japanese Patent Application Laid-Open No. H11-216273 discloses a method of manufacturing a model in which a head portion and a body portion of the model are prepared by materials of different qualities, the head portion and the body portion are molded based on 3D shape data, and the molded head portion and body portion are integrated by mutually joining them.

In Japanese Patent Application Laid-Open No. H11-216273, a method of manufacturing a model having a size and a shape that have been predetermined is presumed. For example, when the size of model exceeds a maximum size of a model that can be molded by a molding apparatus, it is necessary that the model is finely divided into portions within a range of the maximum size, and the divided portions are molded and joined. When the model of a predetermined shape is divided, fitting portions of predetermined shapes can be also set to predetermined positions. In the case of dividing a model that does not have a predetermined shape, however, it is difficult to set fitting portions of predetermined shapes to predetermined positions. If a model is designed in such a manner that no fitting portions are provided for the model to be divided, and the model is rectilinearly divided, there is also such a problem that when the divided models are joined, their positioning is difficult and, further, their joints are easily deviated.

It is, therefore, an object of the invention to provide a print data dividing apparatus in which 3D image data is divided into a plurality of areas, a fitting shape (joint portion) of a kind corresponding to a size of a joint surface of each area, and a position of the area is provided for such a joint surface, and 3D shape data for division printing is generated.

SUMMARY OF THE INVENTION

According to one aspect, the invention provides a print data dividing apparatus comprising a dividing unit configured to divide three dimensional (3D) image data, having image information and distance information for every pixel, into a plurality of areas, a determining unit configured to determine a kind of joining process to a joint surface of a target area among the plurality of areas on the basis of a position of the target area among all of the plurality of areas and a thickness of the joint surface or a length of a side of the joint surface, and a generating unit configured to generate 3D shape data for division printing of the target area in which a joint portion corresponding to the determined kind of joining process has been provided for the joint surface.

According to the aspect of the invention, the 3D image data is divided into the plurality of areas, and, when the 3D shape data for division printing of the plurality of areas to be joined is generated, the joint portion of the kind corresponding to the thickness or the length of side of the joint surface of each area, and the position among all of the areas is provided for the joint surface. Therefore, there is such an advantage that when a plurality of printed models that were formed by a printing device and are related to a plurality of areas are mutually joined, their positioning can be easily performed and each printed matter is difficult to be deviated.

Further features of the present invention will become apparent from the following description of exemplary embodiments with reference to the attached drawings.

BRIEF DESCRIPTION OF THE DRAWINGS

FIGS. 8A, 8B, 8C, and 8D are conceptual diagrams of divided areas and joint portions according to the second embodiment.

DESCRIPTION OF THE EMBODIMENTS

Preferred embodiments of the present invention will now be described in detail below in accordance with the accompanying drawings. The invention is not limited to, for example, a digital single-lens reflex camera and a digital compact camera, and can be applied to a digital video camera, a cellular phone, a 3D scanner, a generating apparatus of 3D print data in a computer apparatus, and the like.

First Embodiment

Figure 1:
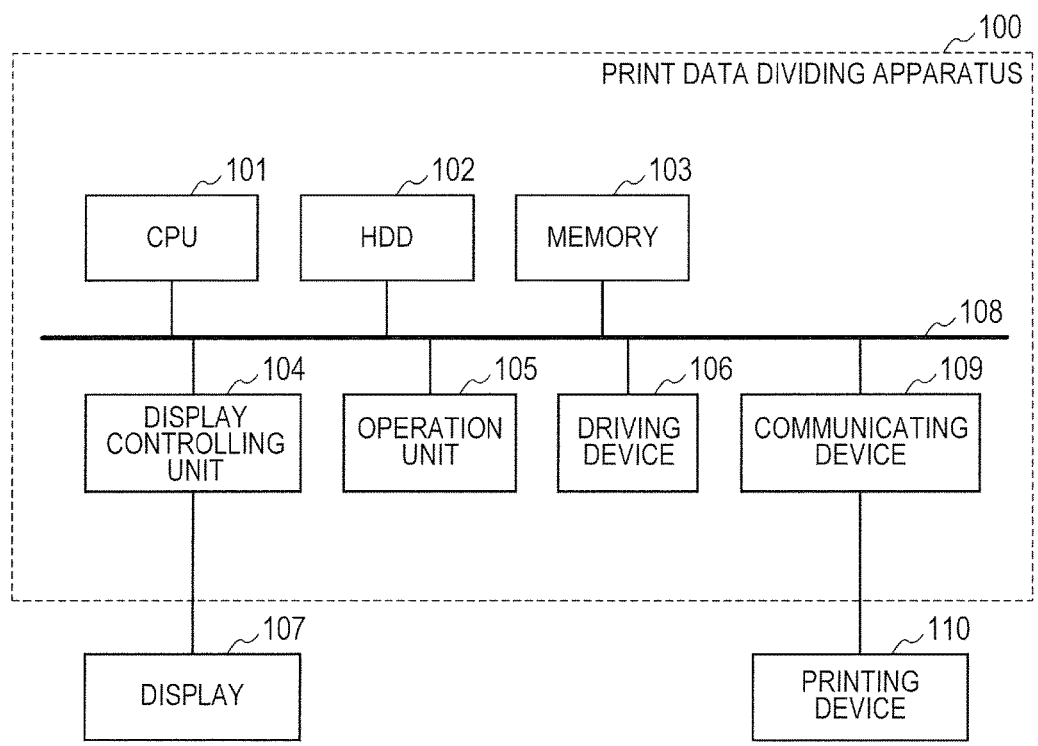
FIG. 1 is block diagram of a print data dividing apparatus according to an embodiment of the invention.

FIG. 1 illustrates a construction of a print data dividing apparatus 100 according to the first embodiment of the invention. As illustrated in FIG. 1, the print data dividing apparatus 100 can be constructed by using a general computer.

The print data dividing apparatus 100 has a central processing unit (CPU) 101, a hard disk drive (HDD) 102, a memory 103, a display controlling unit 104, an operation unit 105, a driving device 106, and a communicating device 109 that are connected to an internal bus 108. The units and devices 101 to 106 and 109, connected to the internal bus 108, mutually communicate data through the internal bus 108.

Three-dimensional (3D) image data, two-dimensional (2D) image data, other data, various kinds of programs by which the CPU 101 operates, and the like, are stored in the HDD 102. The memory 103 is constructed by, for example, a random access memory (RAM). In accordance with the programs stored in the HDD 102, the CPU 101 controls each unit and each device of the print data dividing apparatus 100 by using the memory 103 as a work memory. The CPU 101 is also an inputting unit, a dividing unit, a determining unit, and a generating unit that function on the basis of predetermined programs. The programs for making the CPU 101 operative may have previously been stored in, for example, a read only memory (ROM) (not shown) without limitation to the HDD 102.

The operation unit 105 receives the operation of a user, generates a control signal corresponding to the operation, and supplies the control signal to the CPU 101. For example, as inputting devices for receiving the operation of the user, the operation unit 105 has a character information inputting device, such as a keyboard, or the like, and/or a pointing device, such as a mouse, a stylus pen, a touch panel, or the like. The touch panel is, for example, an inputting device constructed in such a manner that coordinate information, corresponding to a position on the operation unit 105, which is constructed in a flat shape, has been touched, is output.

On the basis of the control signal that is generated and supplied by the operation unit 105 in accordance with the operation of the user performed in the inputting device, the CPU 101 controls the units and devices 102 to 106 and 109 of the print data dividing apparatus 100 in accordance with the predetermined programs. Thus, the print data dividing apparatus 100 executes the operation in accordance with the operation of the user.

The display controlling unit 104 outputs a display signal for displaying an image to a display 107. For example, a display control signal generated by the CPU 101 in accordance with the predetermined program is supplied to the display controlling unit 104. The display controlling unit 104 generates the display signal on the basis of the display control signal and outputs the display signal to the display 107. On the basis of the display control signal supplied from the CPU 101, the display controlling unit 104 displays a graphical user interface (GUI) screen, constituting a GUI, to the display 107.

If the touch panel is used as an operation unit 105, the operation unit 105 and the display 107 can be unitedly constructed. For example, the operation unit 105 and the display 107 may be unitedly constructed in such a manner that the touch panel is attached to an upper layer of a display screen of the display 107, so as not to obstruct the display of the display 107, and input coordinates on the touch panel and display coordinates on the display 107 are made to correspond to each other. Thus, such a GUI that the user can operate as if he could directly operate the screen displayed on the display 107 can be constructed.

An external storage medium (not shown), such as a compact disc (CD) or a digital versatile disc (DVD), is detachable to the driving device 106. On the basis of the control of the CPU 101, the driving device 106 reads out data from the attached external storage medium or writes data into the external storage medium. The external storage medium, which is detachable to the driving device 106, is not limited to a disk recording medium, such as a CD or DVD, and, for example, a non-volatile semiconductor memory, such as a memory card, or the like, may be attached to the driving device 106.

On the basis of the control of the CPU 101, through a network (not shown), such as a local area network (LAN) or the Internet, the communicating device 109 communicates with an external device, such as a printing device 110, or the like, connected to the print data dividing apparatus 100. As for the printing device 110, a printable maximum print size (i.e., a maximum size in terms of a vertical dimension, a horizontal dimension, and a thickness) has been predetermined in accordance with specifications of the printing device 110. The printing device 110 forms a printed matter (i.e., a model) corresponding to the data from the print data dividing apparatus 100.

Subsequently, a method of generating 3D shape data for division printing from 3D image data, having the image information for every 2D pixel and the distance information for every pixel, by the print data dividing apparatus 100 of the embodiment will be described.

First, on the basis of the maximum print size of the printing device 110, the CPU 101 divides the original 3D image data corresponding to the desired print vertical/horizontal sizes (also referred to as "desired print sizes") of the user into a plurality of areas. On the basis of a thickness of a joint surface of each area and a position in the whole 3D image data of each area, the CPU 101 generates 3D shape data for division printing in which a joint portion of a different kind has been provided for the joint surface of each area.

Figure 2:
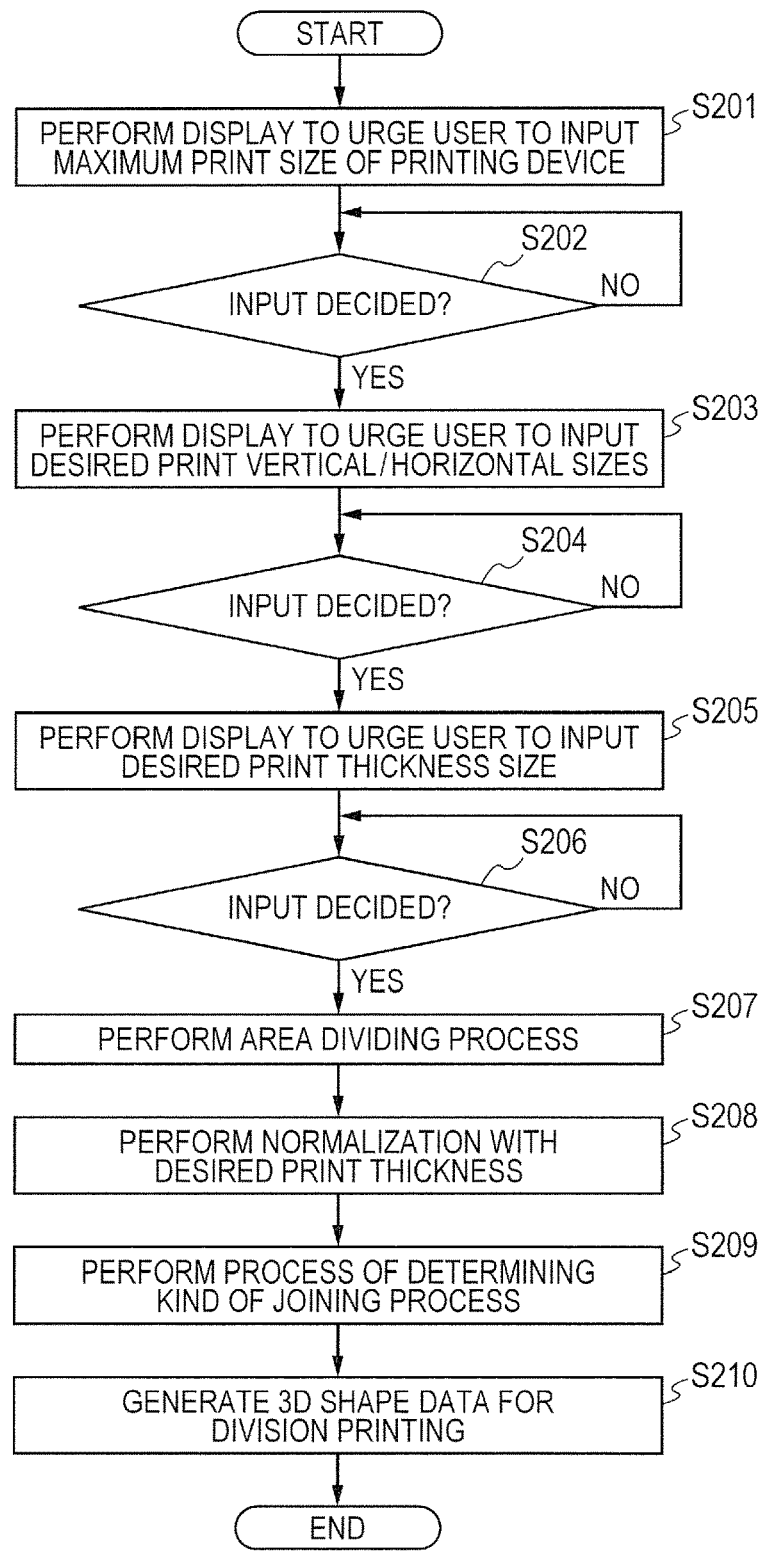
FIG. 2 is a flowchart about a generation of 3D shape data for division printing according to the first embodiment.
Figures 3, 3A:
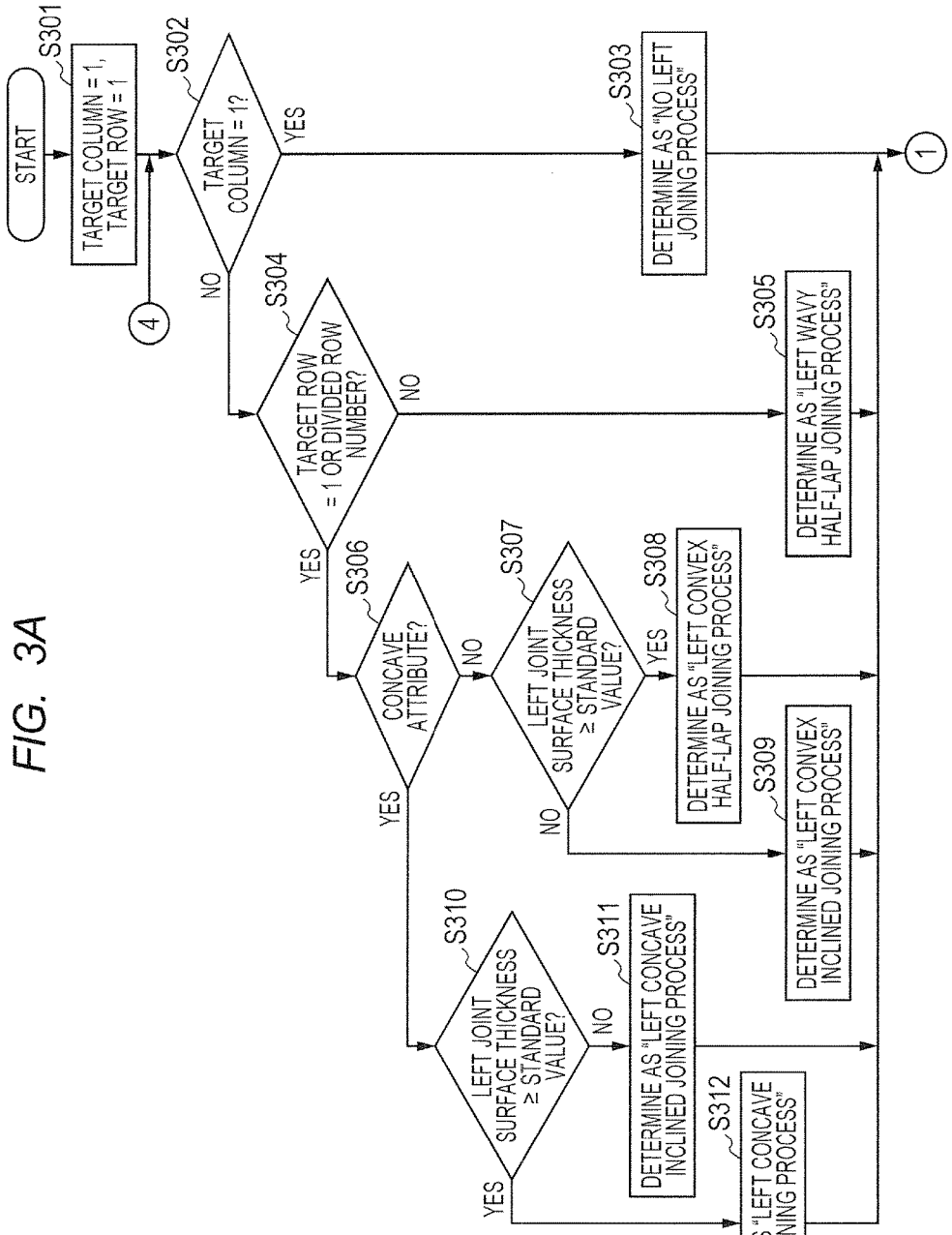
FIG. 3, which is composed of FIGS. 3A, 3B, 3C, and 3D, is, a flowchart for describing a determination of a kind of joining process according to the first embodiment.
Figure 3B:
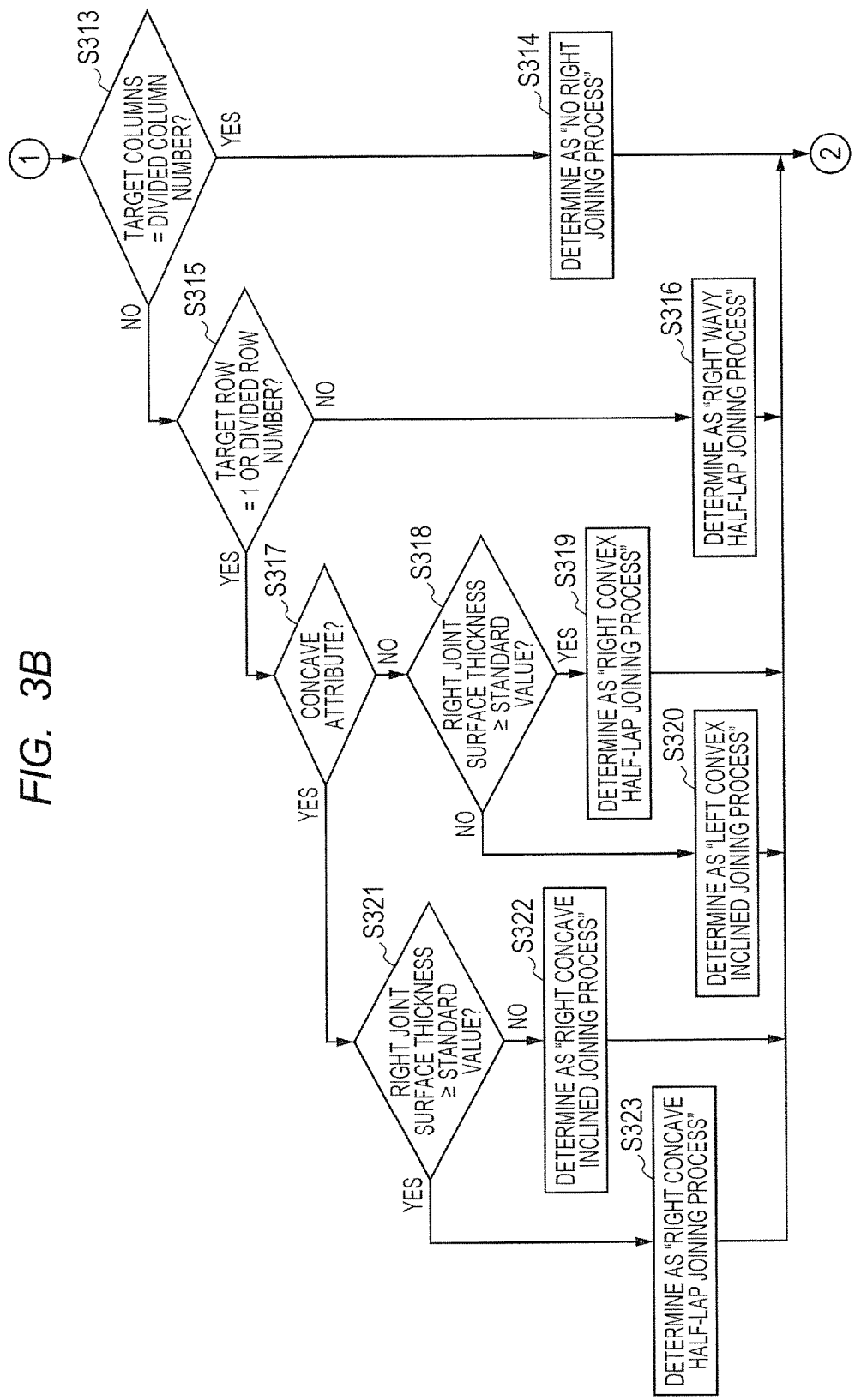
Figure 3C:
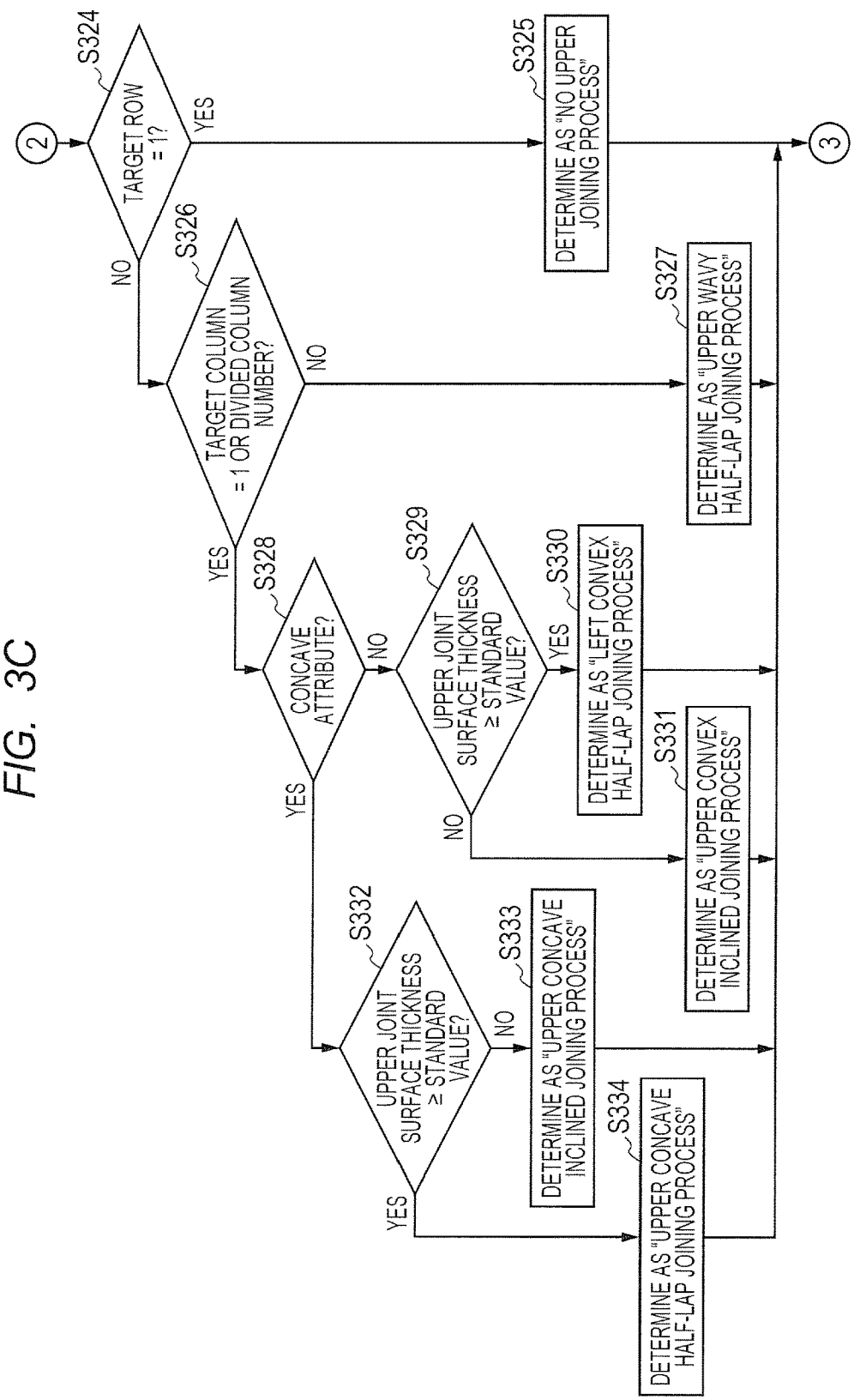
Figure 3D:
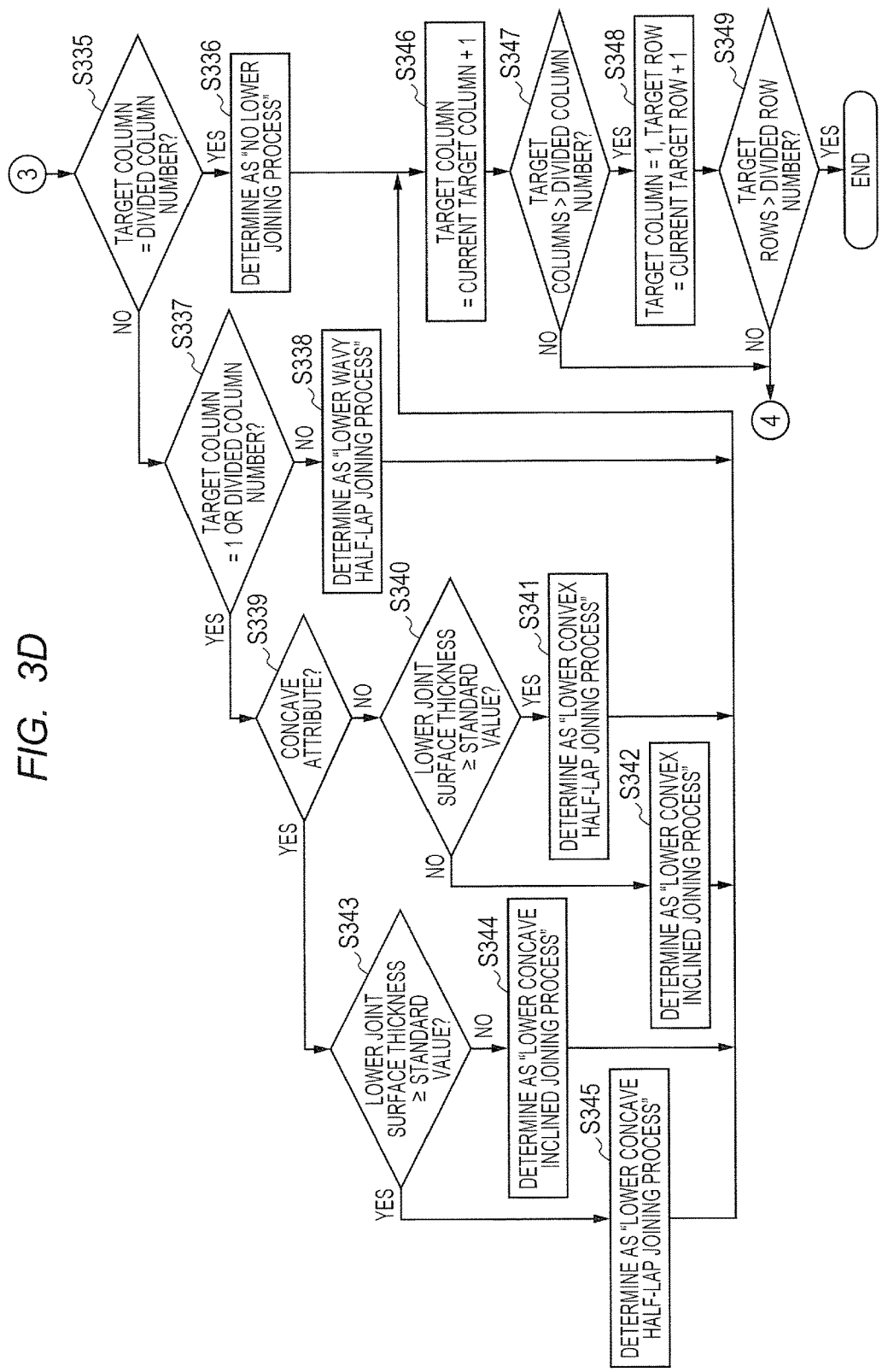
Figure 4:
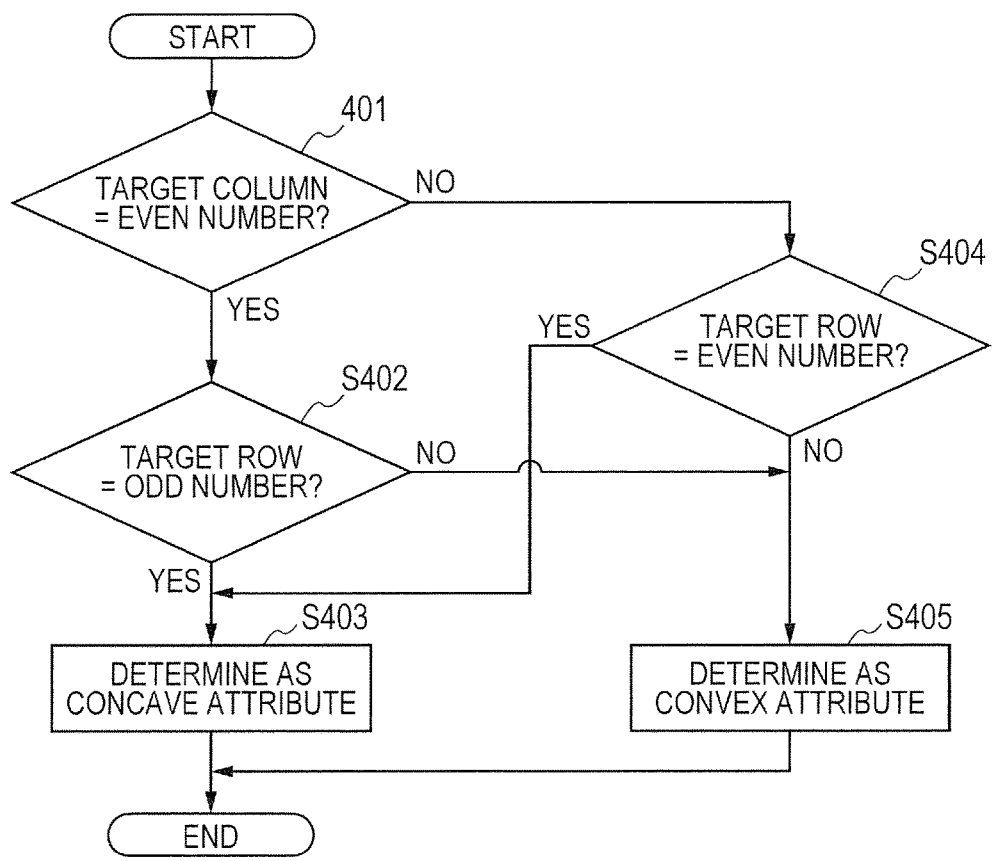
FIG. 4 is a flowchart for describing a determination of a concave/convex attribute according to the first embodiment.

FIG. 2 is a flowchart for a process of converting the 3D image data into the 3D shape data for division printing. FIG. 3 is a flowchart for a process of determining a kind of joining process (that is, a kind of joint portion provided for the joint surface). FIG. 4 is a flowchart for a process of determining a concave/convex attribute of a fitting that is decided in accordance with the position (matrix) of each area. FIGS. 5A to 5D are conceptual diagrams illustrating each area, shapes, and the like, of the joint portions provided for the joint surfaces.

First, in step S201 in FIG. 2, the CPU 101 (inputting unit) sends the display control signal to the display controlling unit 104. In response to receiving the display control signal, the display controlling unit 104 performs a display to prompt the user to input maximum print sizes in three directions of (vertical, horizontal, and thickness) of a printing device to be used onto the display 107. In step S202, on the basis of the control signal from the operation unit 105, the CPU 101 determines whether or not the input of the maximum print sizes by the user has been decided. If the input has been decided, the processing routine advances to step S203.

In step S203, the CPU 101 (inputting unit) sends the display control signal to the display controlling unit 104, and the display controlling unit 104 performs a display to prompt the user to input desired print vertical/horizontal sizes after a plurality of print models of a plurality of areas formed by the printing device are joined onto the display 107. In step S204, on the basis of the control signal from the operation unit 105, the CPU 101 determines whether or not the input of the desired print vertical/horizontal sizes has been decided. If the input has been decided, the processing routine advances to step S205.

In step S205, the CPU 101 (inputting unit) sends the display control signal to the display controlling unit 104. In response to the display control signal, the display controlling unit 104 performs a display to prompt the user to input a desired print thickness size of a printed model, after portions of the printed model have been joined, onto the display 107. The print thickness size that can be input by the user may be limited to a maximum print thickness that is printable by the printing device 110. In step S206, on the basis of the control signal from the operation unit 105, the CPU 101 determines whether or not the input of the desired print thickness size by the user has been decided. If the input has been decided, step S207 follows.

The position of the pixel in the 3D image data of the printed model that is formed becomes information that is analogous to the print vertical/horizontal sizes. With respect to the distance information held by each pixel of the 3D image data, relative distance differences among the pixels at the time of performing the 3D printing becomes information that is analogous to the print thickness size of the printed matter. In the embodiment, although the printed matter that is formed by the printing device 110 is not limited, a relief shape is presumed, and the print vertical/horizontal sizes correspond to vertical/horizontal sizes of the relief shape.

In step S207, in consideration of an increase in size of each area that is caused by providing the joint portions, the CPU 101 (dividing unit) executes a process (area dividing process) for dividing the 3D image data into a plurality of areas in a matrix form so as to lie within a range of the maximum print sizes input in step S201. By using values that have previously been stored in the HDD 102, or the like, the CPU 101 may discriminate a degree of increase in size caused by providing the joint portions. Alternatively, the CPU 101 may discriminate the degree of increase on the basis of information supplied from the external device, such as a printing device 110, or the like. At this point in time, since no joint portion is provided for the joint surface of each area, each area has a flat joint surface.

Figure 5A:
FIGS. 5A, 5B, 5C, and 5D are conceptual diagrams of divided areas and joint portions according to the first embodiment.
Figure 5B:
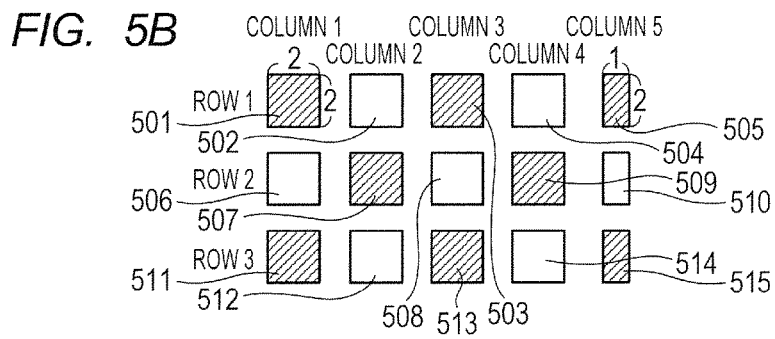

The area dividing process will be described by using examples of FIGS. 5A to 5D. FIG. 5A is an example 500 illustrating the maximum print vertical/horizontal sizes of the printing device 110 that were input in step S201. In this example, it is assumed that the maximum print vertical/horizontal sizes are equal to [(vertical size 3)×(horizontal size 3)]. FIG. 5B illustrates an example in which the original 3D image data has been divided into a plurality of areas 501 to 515 in accordance with the desired print sizes that were input in step S203. Vertical/horizontal sizes of the whole printed matter, obtained by joining printed models the areas 501 to 515, are equal to the desired print vertical/horizontal sizes that were input in step S203.

The number of areas to be divided and the sizes of the areas are set in consideration of the maximum print sizes of the printing device 110, the increase in size caused by providing the joint portion for the joint surface of each area, and the like. In other words, the number of areas to be divided and the sizes of the areas are set in such a manner that even if the joint portion is provided for each area to be divided, the size of each area does not exceed the maximum print sizes (vertical, horizontal, and thickness) of the printing device 110.

In the example of FIG. 5B, assuming that the maximum value of the increase size of the joint portion is equal to 1, the CPU 101 sets the sizes of the areas 501 to 515 to sizes within [(vertical size 2)×(horizontal size 2)] so as to lie within the maximum print sizes of [(vertical size 3)×(horizontal size 3)] of the printing device. It is now assumed that the desired print vertical/horizontal sizes that were input by the user in step S203 are equal to [(vertical size 6)× (horizontal size 9)]. Therefore, FIG. 5B illustrates an example in which the 3D image data matched with the desired sizes of the user has been divided into the fifteen areas 501 to 515 arranged in a matrix form of three rows and five columns as a result in consideration of the limitation [within (vertical size 2)×(horizontal size 2)] of the sizes of each area.

The hatched areas 501, 503, 505, 507, 509, 511, 513, and 515 in FIG. 5B are areas having a convex attribute in the concave and convex attributes of a fitting, which will be described hereafter. As will be described hereafter, the concave and convex attributes of the areas 501 to 515 are set by the CPU 101 at the time of the area dividing process (in step S207) in such a manner that the adjacent areas do not have the same concave/convex attributes so as to prevent a collision of fitting shapes of the joint portions and the occurrence of an area having an inverse pyramid shape. That is, the concave/convex attributes relate to concave and convex states of the joint portion, a convex joint portion is provided for the area having the convex attribute, and a concave joint portion, formed so as to receive a convex joint portion of the adjacent area, is provided for the area having the concave attribute.

As mentioned above, the area dividing process can be executed in such a manner that even if the joint portion is provided for each area, the increase size lies within the maximum print size of the printing device 110. In the following description, "upper" indicates the direction of the small row number, "lower" indicates the direction of the large row number, "left" indicates the direction of the small column number, and "right" indicates the direction of the large column number, respectively.

The position of each of the areas 501 to 515 is expressed by a matrix defined by (row, column). Below, among the areas 501 to 515, the area serving as a target of the discrimination of the kind of joining process, which is made by the CPU 101, is called "target area" and its position (matrix) is expressed by "target matrix" defined by ("target row", "target column"). For example, the position of the area 509 is expressed by (row 2, column 4) and the position of the target area 512 is expressed by (target row 3, target column 2). This is true of the second embodiment.

Returning to a description of FIG. 2, in step S208, the CPU 101 normalizes the maximum distance difference of the distance information held in each pixel of the 3D image data by a user's desired print thickness that was input in step S205. Thus, the maximum distance difference between a long distance and a short distance is converted into the maximum print thickness upon printing. Even in the long distance, since the thickness cannot be set to zero, the maximum print thickness is actually equal to a remaining thickness obtained by subtracting a base thickness.

In step S209, the CPU 101 executes a process for determining a kind of joining process to the joint surface of the divided area (that is, a kind of joint portion provided for the joint surface). The determining process will now be described in detail with reference to FIGS. 3 and 4.

FIG. 3 is a flowchart for determining the kind of joining process for the joint surface of the divided area. In step S301, the CPU 101 initializes the area (target area) serving as a target for determination of the kind of joining process as an area located at a position of (target row 1, target column 1). That is, the target area after the initialization is the upper-left-most area 501 in FIG. 5B.

In step S302, the CPU 101 determines whether or not the target column of the target area is (column 1). If it is (column 1), the processing routine advances to step S303. If it is not (column 1), step S304 follows. That is, in step S302, the CPU 101 determines whether or not the position of the target area is located at (column 1) (leftmost side) in the examples of FIGS. 5A to 5D. In step S303, the CPU 101 determines that the kind of joining process to the left joint surface of the target area is a "no left joining process", and advances to step S313.

Figure 5C:
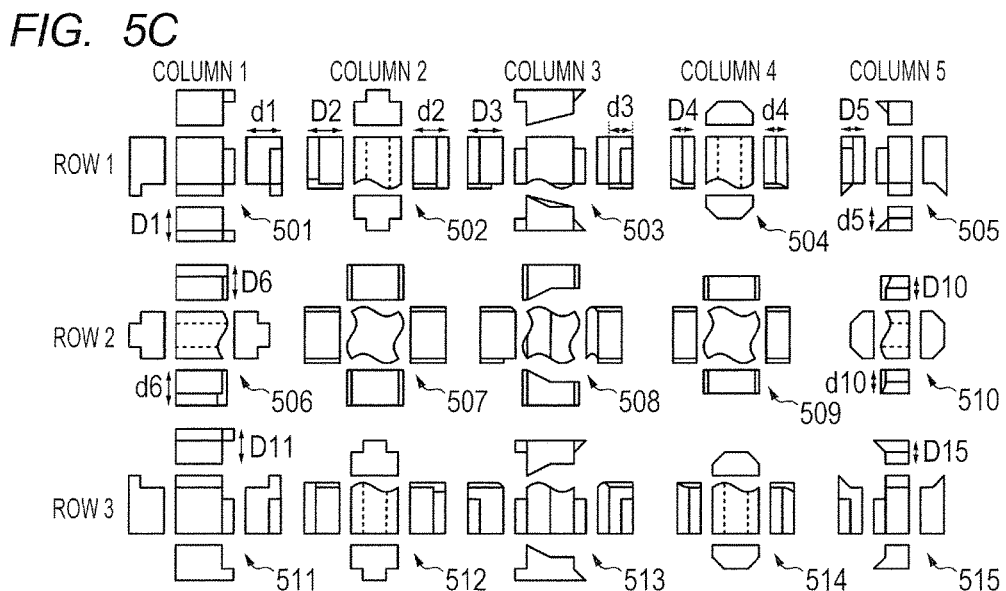

FIG. 5C is an example of orthogonal projection diagrams of 3D shapes of the areas 501 to 515 obtained after the joining process was executed. In each of the orthogonal projection diagrams, a center diagram in the case of facing a paper surface is a plan view showing the surface of a printed model of a 3D shape, an upper diagram is a rear view, a lower diagram is a front view, a right diagram is a right side elevational view, and a left diagram is a left side elevational view, respectively. A layout of the areas 501 to 515 in FIG. 5C correspond to that in FIG. 5B.

When the positions (target matrices) of the target areas are equal to (row 1, column 1), (row 2, column 1), and (row 3, column 1), respectively, since partners to be joined do not exist on the left joint surfaces of the target areas 501, 506, and 511, the CPU 101 decides that the kind of joining process is a "no left joining process". Therefore, as illustrated in the left edges of the plan views, front views, and rear views of the orthogonal projection diagrams of the areas 501, 506, and 511 in FIG. 5C, no joint portion is provided for the left side surface of the area that was determined to be "no left joining process" and the left side surface becomes a single flat surface.

The kind of joining process decided by the CPU 101 is stored in the memory 103 in association with the joint surface serving as a target of the target area and is used when generating 3D shape data for division printing in step S210, which will be described hereafter. Also with respect to the following determination of the kind of joining process, the decided kind is similarly stored in the memory 103 in association with the joint surface serving as a target of the target area.

Returning to the description of FIG. 3, in step S304, the CPU 101 determines whether or not the target row showing the position of the target area is equal to (row 1) or the divided row number obtained by the division performed in step S207. If it is equal, step S306 follows. If it is not equal, step S305 follows. That is, the CPU 101 determines whether or not the target area is an area located in the first or last row. In the example of FIG. 5B, the CPU 101 determines whether or not the target area is an area located in (row 1) or (row 3).

In step S305, since the target area is not the area located in the first or the last row, the CPU 101 decides that the kind of joining process to the left joint surface of the target area is a "left wavy half-lap joining process", and advances to step S313. In this instance, as for "left wavy half-lap joining process", as illustrated in the left edge of the plan view of the area 507 in FIG. 5C, a half-lap joint portion of a sine wave curved shape having concave and convex portions is provided for the left joint surface of the area 507. In the example of "left wavy half-lap joining process" illustrated in FIG. 5C, a sine wave curved surface, in which a maximum horizontal convex size is equal to 0.25, a minimum horizontal concave size is equal to 0.25, and a vertical size of one wave is equal to 2, is provided for the left joint surface of the area 507 in FIG. 5B.

As will be described later in step S316, as shown in a right edge of the plan view of the area 507, a half-lap joint portion of a sine wave curved shape, having concave/convex portions that face the right side surface of the area 507, is provided as a "right wavy half-lap joint portion", for the area 506 serving as a fitting partner of the left side of the area 507. Therefore, the "left wavy half-lap joint portion" provided for the left joint surface of the area 507 is fitted to the "right wavy half-lap joint portion" of the area 506.

Figure 5D:
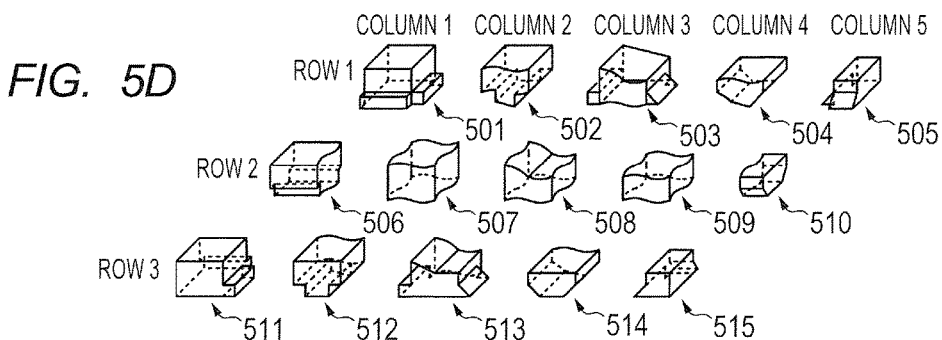

FIG. 5D is an oblique projection diagram of a 3D shape of each of the areas 501 to 515 in which the joining process has been executed to the joint surface. Surfaces corresponding to the front view, plan view, and right side elevational view of FIG. 5C are seen. A layout of the areas 501 to 515 corresponds to those illustrated in FIGS. 5B and 5C.

Since a curved surface as a wavy half-lap joint is provided for the joint surface of the area 507 located at (row 2, column 2) in such a direction as to vertically cut from the obverse surface (plan view) to the back surface (not shown), there is no limitation of the minimum thickness necessary for the joint. Although the example of the sine wave curved surface has been mentioned as a shape of the wavy half-lap joint portion, it is not limited to such a shape. A rectangular or triangular wave shape may be used so long as it is such a surface that the surfaces that face each other are properly fitted, or a concave/convex shaped dividing line may be used. For easily drawing, a sine wave shaped dividing line that can be joined from any one of the depth direction and the horizontal direction is used. Therefore, for example, even in a circular concave/convex shaped dividing line, like a jigsaw puzzle, the areas can be fitted by relatively sliding in the depth direction as if the puzzle was assembled.

In the "left wavy half-lap joining process", after the area dividing process in step S207 (at this point of time, the dividing line between the areas is rectilinear), as for the area 507 located at (row 2, column 2), pixel components that hit the convex wave of the "left wavy half-lap joint portion" are fetched from the area 506 located at the left neighboring position (row 2, column 1). At the same time, in the area 507, pixel components that hit the concave wave are moved to the area 506. In other words, in the area 506, pixel components that hit the convex wave of the "left wavy half-lap joint portion" of the area 507 are fetched. In this manner, the pixel data of the adjacent areas 506 and 507 is exchanged, a new wavy dividing line is defined, and a wavy half-lap joint portion is provided on the right side of the area 506 and the left side of the area 507. The area provided with the wavy half-lap joint portion has a wavy fitting effect, the pixel data in this area is converted into 3D shape data as will be described hereafter, and 3D shape data for division printing of such an area is generated.

In step S306, the CPU 101 determines whether or not the concave/convex attribute of the target area is the concave attribute. If it is the concave attribute, step S310 follows. If it is not the concave attribute, step S307 follows. That is, the CPU 101 determines whether or not the target area is a white-on-black area in FIG. 5B.

In step S307, the CPU 101 determines whether or not the thickness of left joint surface of the target area is equal to or greater than a predetermined standard value. If it is equal to or greater than the predetermined standard value, step S308 follows. If NO, that is, if it is less than the predetermined standard value, step S309 follows. For example, if the target area is the area 503 located at (row 1, column 3), the CPU 101 decides the thickness (D3) of a left joint surface of the area 503 and determines that it is equal to or greater than the predetermined standard value as illustrated in FIG. 5C. On the other hand, if the target area is the area 505 located at (row 1, column 5), the CPU 101 decides the thickness (D5 (<D3)) of a left joint surface of the area 505 and determines that it is less than the predetermined standard value as illustrated in FIG. 5C. For example, it is now assumed that the predetermined standard value is equal to a value that is three times as large as the thickness of the portion that projects in a convex shape as a "convex half-lap joint portion", when a thickness size of the convex projection is equal to 0.5, the predetermined standard value is equal to 1.5. The predetermined standard value is not limited to such a value, and may be set based on conditions, such as intensity, and the like, of a raw material that is used for a printed model.

In step S308, since the thickness of the left joint surface of the target area is equal to or greater than the predetermined standard value, the CPU 101 decides that the process to the left joint surface of the target area is a "left convex half-lap joining process", and advances to step S313.

In the "left convex half-lap joining process", if the target area is the area 503 located at (row 1, column 3), as illustrated in the left edges of the rear view and the front view of the area 503 in FIG. 5C, a "left convex half-lap joint portion" of a left convex shape is provided for the left joint surface of the area 503. In more detail, to the left joint surface of the area 503 obtained after the area dividing process illustrated in FIG. 5B, the CPU 101 generates an area for addition having a pixel size corresponding to the "left convex half-lap joint portion" of a horizontal size of 0.5 and a vertical size of 1.5 and distance information of such a thickness size of 0.5. The CPU 101 provides the area for addition for the area 503, converts the area 503 into 3D shape data, as will be described hereafter, and generates 3D shape data for division printing for the area 503 in which the left convex half-lap joint portion has been provided for the left joint surface. On the other hand, although a detailed description will be made hereafter with regard to step S323, a "right concave half-lap joint portion" of a right concave shape is provided for the right joint surface of the area 502 located at (row 1, column 2) of the fitting partner, as illustrated in the right edges of the rear view and the front view of the area 503 in FIG. 5C, and is fitted to the "left convex half-lap joint portion" of the left joint surface of the area 503.

In step S309, since the thickness of left joint surface of the target area is less than the predetermined standard value, the CPU 101 decides that the kind of joining process to the left joint surface of the target area is a "left convex inclined joining process", and advances to step S313.

In the "left convex inclined joining process", if the target area is the area 505 located at (row 1, column 5), as illustrated in the rear view and the front view of the area 505 in FIG. 5C, a "left convex inclined joint portion" of a left-oblique convex shape is provided. In more detail, to the left joint surface of the area 505 in FIG. 5B, the CPU 101 generates an area for addition having a pixel size corresponding to the "left convex inclined joint portion" of a horizontal size of 0.5 and a vertical size of 1.5 and distance information that increases linearly toward the right up to the thickness size of 0.5. The CPU 101 adds such an area for addition to the area 505, converts the area 505 into 3D shape data, as will be described hereafter, and generates 3D shape data for division printing of the area 505 in which the "left convex inclined joint portion" has been provided for the left joint surface. On the other hand, although a detailed description will be made hereafter with regard to step S322, to the right joint surface of the area 504 located at (row 1, column 4) of the fitting partner, a "right concave inclined joint portion" that is right-obliquely inclined in a concave shape is provided, as illustrated in the right edges of the rear view and the front view of the area 504 in FIG. 5C, and is fitted to the "left convex inclined joint portion" of the left joint surface of the area 505.

In step S310, the CPU 101 determines whether or not the thickness of left joint surface of the target area is equal to or greater than a predetermined standard value. If it is equal to or greater than the predetermined standard value, step S312 follows. If NO, that is, if it is less than the predetermined standard value, step S311 follows. For example, if the target area is the target area 502 located at (row 1, column 2), the CPU 101 decides the thickness (D2) of left joint surface of the area 502 illustrated in FIG. 5C and determines that it is equal to or greater than the predetermined standard value. On the other hand, if the target area is the target area 504 located at (row 1, column 4), the CPU 101 decides the thickness (D4 (<D2)) of left joint surface of the area 504 illustrated in FIG. 5C and determines that it is less than the predetermined standard value.

In step S311, since the thickness of left joint surface of the target area is less than the predetermined standard value, the CPU 101 decides that the kind of joining process to the left joint surface of the target area is a "left concave inclined joining process", and advances to step S313.

In the "left concave inclined joining process", if the target area is the area 504 located at (row 1, column 4), as illustrated in the left edges of the rear view and the front view of the area 504 in FIG. 5C, a "left concave inclined joint portion" of a left-oblique concave shape is provided. In more detail, to the left joint surface of the area 504 illustrated in FIG. 5B, the CPU 101 generates an area for deletion having a pixel size corresponding to the "left concave inclined joint portion" of a horizontal size of 0.5 and a vertical size of 2 and distance information that decreases linearly toward the right from the thickness size of 0.5. The CPU 101 deletes the area for deletion from the area 504, converts the area 504 into 3D shape data, as will be described hereafter, and generates 3D shape data for division printing of the area 504 in which the "left concave inclined joint portion" has been provided for the left joint surface. On the other hand, as will be described hereafter with regard to step S320, to the area 503 of the fitting partner, a "right convex inclined joint portion" of a right-oblique convex shape is provided, as illustrated in the right edges of the rear view and the front view of the area 503 in FIG. 5C, and is fitted to the "right convex inclined joint portion" of the left joint surface of the area 504.

In step S312, since the thickness of left side surface of the target area is equal to or greater than the predetermined standard value, the CPU 101 decides that the kind of joining process to the left joint surface of the target area is a "left concave half-lap joining process", and advances to step S313.

In the "left concave half-lap joining process", if the target area is the area 502 located at (row 1, column 2), as illustrated in the left edges of the rear view and the front view of the target area 502 in FIG. 5C, a "left concave half-lap joint portion" that is concave is provided for the left joint surface. In more detail, to the left joint surface of the area 502 illustrated in FIG. 5B, the CPU 101 generates an area for deletion having a pixel size corresponding to the "left concave half-lap joint portion" of a horizontal size of 0.5 and a vertical size of 2 and distance information of the thickness size of 0.5. The CPU 101 deletes such an area for deletion from the area 502, converts the area 502 into 3D shape data, as will be described hereafter, and generates 3D shape data for division printing of the area 502 in which the "left concave half-lap joint portion" has been provided for the left joint surface. On the other hand, as will be described hereafter with regard to step S319, to the area 501 located at (row 1, column 1) of the fitting partner, a "right convex half-lap joint portion" of a right-convex shape is provided, as illustrated in the rear view and the front view of the area 501 in FIG. 5C, and is fitted to the "left concave half-lap joint portion" of the left joint surface of the area 502.

In step S313, the CPU 101 determines whether or not the target column of the target area is equal to the divided column number obtained by the division executed in step S207. If it is equal, step S314 follows. If it is not equal, step S315 follows. That is, in step S313, the CPU 101 discriminates whether or not the target area is an area located at (column 5) (rightmost side) in the examples of FIGS. 5A to 5D.

In step S314, since the target column of the target area is equal to the divided column number obtained by the division executed in step S207, the CPU 101 decides that the kind of joining process to the right joint surface of the target area is a "no right joining process", and advances to step S324. If the target area is located at (row 1, column 5), (row 2, column 5), or (row 3, column 5), since partners to be joined do not exist on the right joint surface of the target area, the CPU 101 decides that the kind is a "no right joining process". The right joint surface becomes a flat surface, as shown in the right edges of the rear view, the plan view, and the front view in FIG. 5C.

In step S315, the CPU 101 determines whether or not the target row of the target area is equal to (row 1) or the divided row number obtained by the division executed in step S207. If it is equal, step S317 follows. If it is not equal, step S316 follows. That is, the CPU 101 discriminates whether or not the target area is an area located at the first row or the last row, that is, in the example of FIG. 5B, whether or not the target area is an area located at (row 1) or (row 3).

In step S316, since the target area is not the area located at the first row or the last row, the CPU 101 decides that the kind of joining process to the right joint surface of the target area is a "right wavy half-lap joining process", and advances to step S324.

In the "right wavy half-lap joining process", if the target area is the area 506 located at (row 2, column 1), as illustrated in the right edge of the plan view of the area 506 in FIG. 5C, a "right wavy half-lap joint portion" of a sine wave curved shape having both of the concave and convex portions is provided for the right joint surface of the area 506. As mentioned with regard to step S305, a "left wavy half-lap joint portion" is provided for the left joint surface of the area 507 located at (row 2, column 2) of the fitting partner and is fitted to the "right wavy half-lap joint portion" of the right joint surface of the area 506.

As illustrated in FIG. 5D, the "right wavy half-lap joint portion" of the sine wave curved shape is provided for the right joint surface of the area 506 located at (row 2, column 1) and the "left wavy half-lap joint portion" of the sine wave curved shape is provided for the left joint surface of the area 507 located at (row 2, column 2), which faces the area 506. As mentioned above, the joint between the areas 506 and 507 is not performed by the flat-like "grinding joint," but those areas come into engagement and are positioned by a "wavy half-lap joint" provided as a curved surface that vertically cuts from the obverse surface to the back surface, so that their positions are difficult to be deviated and those areas are easily joined.

In step S317, the CPU 101 determines whether or not the attribute of the target area is the concave attribute. If it is the concave attribute, step S321 follows. If it is not the concave attribute, step S318 follows.

In step S318, the CPU 101 determines whether or not a thickness of right joint surface of the target area is equal to or greater than a predetermined standard value. If it is equal to or greater than the predetermined standard value, step S319 follows. If NO, that is, if it is less than the predetermined standard value, step S320 follows. If the target area is the area 501 located at (row 1, column 1), as illustrated in FIG. 5C, the CPU 101 determines a thickness (d1) of right joint surface of the area 501 and decides that it is equal to or greater than the predetermined standard value. On the other hand, if the target area is the area 503 located at (row 1, column 3), as illustrated in FIG. 5C, the CPU 101 determines a thickness (d3 (<d1)) of right joint surface of the area 503 and decides that it is less than the predetermined standard value.

In step S319, since the thickness of right joint surface of the target area is equal to or greater than the predetermined standard value, the CPU 101 decides that the kind of joining process to the right joint surface of the target area is a "right convex half-lap joining process", and advances to step S324.

In the "right convex half-lap joining process", if the target area is the area 501 located at (row 1, column 1), as illustrated in the right edges of the rear view and the front view of the area 501 in FIG. 5C, a "right convex half-lap joint portion" of a right convex shape is provided. In more detail, to the right joint surface of the area 501 obtained after the area dividing process illustrated in FIG. 5B, the CPU 101 generates an area for addition having a pixel size corresponding to the "right convex half-lap joint portion" of a horizontal size of 0.5 and a vertical size of 1.5 and distance information of such a thickness size of 0.5. The CPU 101 adds the area for addition to the area 501, converts the area 501 into 3D shape data, as will be described hereafter, and generates 3D shape data for division printing of the area 501 in which the right convex half-lap joint portion has been provided for the right joint surface. On the other hand, the "left concave half-lap joint portion" has been provided for the left joint surface of the area 502 located at (row 1, column 2) of the fitting partner, as mentioned with regard to step S312 and is fitted to the "right convex half-lap joint portion" of the right joint surface of the area 501.

A "right convex half-lap joint portion" of a right convex shape is provided for the right joint surface of the area 501 illustrated in FIG. 5D. A "left concave half-lap joint portion" of a concave shape is provided for the left joint surface of the area 502 that faces the area 501. As mentioned above, the joint between the areas 501 and 502 is not performed by the flat-like "grinding joint," but those areas come into engagement and are positioned by the "half-lap joint portions" provided at bottom positions away from the obverse layers of the areas 501 and 502, so that their positions are difficult to be deviated and those areas are easily joined.

In step S320, since the thickness of right joint surface of the target area is less than the predetermined standard value, the CPU 101 decides that the kind of joining process to the right joint surface of the target area is a "right convex inclined joining process", and advances to step S324.

In the "right convex inclined joining process", if the target area is the area 503 located at (row 1, column 3), as illustrated in the right edges of the rear view and the front view of the area 503 in FIG. 5C, a "right convex inclined joint portion" of a right-oblique convex inclined shape is provided. In more detail, to the right joint surface of the area 503 obtained after the division in FIG. 5B, the CPU 101 generates an area for addition having a pixel size corresponding to the "right convex inclined joint portion" of a horizontal size of 0.5 and a vertical size of 1.5 and distance information that decreases linearly toward the right from the thickness size of 0.5. The CPU 101 adds such an area for addition to the right joint surface of the area 503, converts the area 503 into 3D shape data as will be described hereafter, and generates 3D shape data for division printing of the area 503 having the "right convex inclined joint portion". Since the "left concave inclined joint portion" has been provided for the area 504 located at (row 1, column 4) of the fitting partner, as mentioned with regard to step S311, it is fitted to the "right convex inclined joint portion" provided for the right joint surface of the area 503.

A "right convex inclined joint portion" of a right-oblique convex shape is provided for the right joint surface of the area 503 located at (row 1, column 3) illustrated in FIG. 5D. A "left concave inclined joint portion" of an oblique concave shape is provided for the left joint surface of the area 504 located at (row 1, column 4) that faces the area 503. As mentioned above, the joint between the areas 503 and 504 is not performed by the flat-like "grinding joint," but those areas come into engagement and are positioned in a compact size by "inclined joints" of a thin engagement thickness, so that their positions are difficult to be deviated and those areas are easily joined.

In step S321, the CPU 101 determines whether or not the thickness of right joint surface of the target area is equal to or greater than a predetermined standard value. If it is equal to or greater than the predetermined standard value, step S323 follows. If NO, that is, if it is less than the predetermined standard value, step S322 follows. If the target area is the area 502 greater at (row 1, column 2), the CPU 101 decides a thickness (d2) of right joint surface of the area 502 illustrated in FIG. 5C, and determines that it is equal to or greater than the predetermined standard value. On the other hand, if the target area is the area 504 located at (row 1, column 4), the CPU 101 decides a thickness (d4 (<d2)) of right joint surface of the area 504 illustrated in FIG. 5C and determines that it is less than the predetermined standard value.

In step S322, since the thickness of right joint surface of the target area is less than the predetermined standard value, the CPU 101 decides that the kind of joining process to the right joint surface of the target area is a "right concave inclined joining process", and advances to step S324.

In the "right concave inclined joining process", if the target area is the area 504 located at (row 1, column 4), as illustrated in the rear view and the front view of the area 504 in FIG. 5C, a "right concave inclined joint portion" of a right-oblique concave inclined shape is provided. In more detail, to the right joint surface of the area 504 obtained after the division in FIG. 5B, the CPU 101 generates an area for deletion having a pixel size corresponding to the "right concave inclined joint portion" of a horizontal size of 0.5 and a vertical size of 2.25 and distance information that decreases toward the left from the thickness size of 0.5. The CPU 101 deletes the area for deletion from the area 504 as will be described hereafter, converts the area 504 into 3D shape data, and generates 3D shape data for division printing of the area 504 in which the "right concave inclined joint portion" has been provided. Since the "left convex inclined joint portion" of the left-oblique convex shape has been provided for the left joint surface of the area 505 located at (row 1, column 5) of the fitting partner, as mentioned with regard to step S309, it is fitted to the "right concave inclined joint portion" provided for the right joint surface of the area 504.

A "right concave inclined joint portion" of an oblique concave shape is provided for the right joint surface of the area 504 located at (row 1, column 4) illustrated in FIG. 5D. A "left convex inclined joint portion" of a left-oblique convex shape is provided for the left joint surface of the area 505 located at (row 1, column 5) that faces the area 504. As mentioned above, the joint between the areas 504 and 505 is not performed by the flat-like "grinding joint," but those areas come into engagement and are positioned by the "inclined joints" of a thin engagement thickness provided at bottom positions that are not seen from the obverse layers of the areas 504 and 505. Therefore, the positions of the areas 504 and 505 are difficult to be deviated and those areas are easily joined. If dividing lines seen in the obverse layers of the areas 504 and 505 are decided so that a joint boundary between the areas is inconspicuous and the "inclined joints" are provided at the positions of the bottom portions of the areas 504 and 505, both of a beautiful appearance of the obverse layers and convenience at the time of the joining work can be accomplished.

In step S323, since the thickness of right joint surface of the target area is equal to or greater than the predetermined standard value, the CPU 101 decides that the kind of joining process to the right joint surface of the target area is a "right concave half-lap joining process", and advances to step S324.

In the "right concave half-lap joining process", if the target area is the area 502 located at (row 1, column 2), as illustrated in the right edges of the rear view and the front view of the area 502 in FIG. 5C, a "right concave half-lap joint portion" of a concave shape is provided. In more detail, to the right joint surface of the area 502 obtained after the division in FIG. 5B, the CPU 101 generates an area for deletion having a pixel size corresponding to the "right concave half-lap joint portion" of a horizontal size of 0.5 and a vertical size of 2.25 and distance information of such a thickness size of 0.5. The CPU 101 deletes the area for deletion from the area 502, converts the area 502 into 3D shape data, as will be described hereafter, and generates 3D shape data for division printing of the area 502 in which the "right concave half-lap joint portion" has been provided. A "left convex half-lap joint portion" of a left convex shape is provided for the left joint surface of the area 503 located at (row 1, column 3) of the fitting partner, as mentioned with regard to step S308 and is fitted to the "right concave half-lap joint portion" provided for the right joint surface of the area 502.

A "right concave half-lap joint portion" of a concave shape is provided for the right joint surface of the area 502 located at (row 1, column 2) in FIG. 5D. A "left convex half-lap joint portion" of a left convex shape is provided for the left joint surface of the area 503 located at (row 1, column 3) that faces the area 502. As mentioned above, the joint between the areas 502 and 503 is not performed by the flat-like "grinding joint," but those areas come into engagement and are positioned by the "half-lap joint portions" provided at bottom positions away from the obverse layers of the areas 502 and 503, so that their positions are difficult to be deviated and those areas are easily joined. If dividing lines seen in the obverse layers of the areas 502 and 503 are decided so that a joint boundary between the areas is inconspicuous and the "half-lap joint portions" are provided at the positions of the bottom portions of the areas 502 and 503, both of a beautiful appearance of the obverse layers and convenience at the time of the joining work can be accomplished.

In step S324, the CPU 101 determines whether or not the target row of the target area is equal to (row 1). If it is equal to (row 1), step S325 follows. If it is not equal to (row 1), step S326 follows. That is, in step S324, the CPU 101 determines whether or not the target area is located at (row 1) (uppermost side) in the examples of FIGS. 5A to 5D.

In step S325, the CPU 101 decides that the kind of joining process to the upper joint surface of the target area is a "no upper joining process", and advances to step S335. For example, if the target areas are the areas 501 to 505 located at positions of (row 1, column 1) to (row 1, column 5), since partners to be joined do not exist on the upper joint surfaces of the areas 501 to 505, the CPU 101 decides that the kind is a "no upper joining process". Therefore, as illustrated in the upper edges of the left side elevational views, the rear views, and the right side elevational views of the areas 501 to 505 in FIG. 5C, the upper joint surfaces of the areas 501 to 505 become flat surfaces.

In step S326, the CPU 101 determines whether or not the target column of the target area is equal to (column 1) or the divided column number obtained by the division executed in step S207. If it is equal, step S328 follows. If it is not equal, step S327 follows. That is, the CPU 101 discriminates whether or not the target area is an area located at the first column or last column in a case in which the target area is divided into areas located at a plurality of positions of the matrix. In other words, in the case of FIG. 5B, the CPU 101 discriminates whether or not the target area is an area located at (column 1) or (column 5).

In step S327, since the target area is not the area located at the first column or last column, the CPU 101 decides that the kind of joining process to the upper joint surface of the target area is an "upper wavy half-lap joining process", and advances to step S335.

In the "upper wavy half-lap joining process", if the target area is the area located at (row 2, column 2), to the upper joint surface of the area 507, an "upper wavy half-lap joint portion" of a sine wave curved shape having both of the concave and convex portions is provided, as illustrated in the upper edge of the front view of the area 507 in FIG. 5C. The "upper wavy half-lap joint portion" illustrated in FIG. 5C is a sine wave curved surface in which a maximum vertical convex size is equal to 0.25, a minimum vertical concave size is equal to 0.25, and a horizontal size of one wave is equal to 2 to the shape of the upper edge of the area 507 in FIG. 5B. In more detail, to the area 507 subjected to the dividing process in step S207 illustrated in FIG. 5B, the CPU 101 fetches pixel components corresponding to the convex wave from the upper adjacent area 502 located at (row 1, column 2) and transfers pixel components corresponding to the concave wave to the area 502. In this manner, the CPU 101 exchanges the pixel data between the areas 502 and 507 and defines a new dividing line, thereby providing the "upper wavy half-lap joint portion" having a wavy engagement effect for the upper joint surface of the area 507. The CPU 101 converts the area 507 into 3D shape data, as will be described hereafter, and generates 3D shape data for division printing of the area 507 in which the "upper wavy half-lap joint portion" has been provided for the upper joint surface. As will be described hereafter with regard to step S338, to the area 502 located at (row 1, column 2) of the fitting partner on the upper side of the area 507, a "lower wavy half-lap joint portion" of a sine wave curved surface having both of the concave and convex portions is provided, as illustrated in the lower edge of the plan view of FIG. 5C, and is fitted to the "upper wavy half-lap joint portion" of the area 507.

In step S328, the CPU 101 determines whether or not the attribute of the target area is the concave attribute. If it is the concave attribute, step S332 follows. If it is not the concave attribute, step S329 follows.

In step S329, the CPU 101 determines whether or not a thickness of upper joint surface is equal to or greater than a predetermined standard value. If it is equal to or greater than the predetermined standard value, step S330 follows. If NO, that is, if it is less than the predetermined standard value, step S331 follows. For example, if the target area is the area 511 located at (row 3, column 1), the CPU 101 decides a thickness (D11) of upper joint surface of the area 511 in FIG. 5C and determines that it is equal to or greater than the predetermined standard value. On the other hand, if the target area is the area 515 located at (row 3, column 5), the CPU 101 decides a thickness (D15) of upper joint surface of the area 515 in FIG. 5C and determines that it is less than the predetermined standard value.

In step S330, since the thickness of upper joint surface of the target area is equal to or greater than the predetermined standard value, the CPU 101 decides that the kind of joining process to the upper joint surface of the target area is an "upper convex half-lap joining process", and advances to step S335.

In the "upper convex half-lap joining process", if the target area is the area 511 located at (row 3, column 1), as illustrated in the upper edges of the left side elevational view and the right side elevational view of the area 511 in FIG. 5C, an "upper convex half-lap joint portion" of an upward convex shape is provided for the upper joint surface of the area 511. In more detail, to the upper joint surface of the area 511 divided in step S207, as illustrated in FIG. 5B, the CPU 101 generates an area for addition having a pixel size corresponding to the "upper convex half-lap joint portion" of a vertical size of 0.5 and a horizontal size of 2 and distance information of such a thickness size of 0.5. The CPU 101 adds the area for addition to the area 511 illustrated in FIG. 5B, converts the area 511 into 3D shape data, as will be described hereafter, and generates 3D shape data for division printing of the area 511 in which the upper convex half-lap joint portion has been provided for the upper joint surface. As will be described hereafter with regard to step S345, to the area 506 located at (row 2, column 1) of a fitting partner, a "lower concave half-lap joint portion" of a concave shape is provided, as illustrated in the lower edges of the left side elevational view and the right side elevational view in FIG. 5C, and is fitted to the "upper convex half-lap joint portion" of the upper joint surface of the area 511.

In step S331, since the thickness of upper joint surface of the target area is less than the predetermined standard value, the CPU 101 decides that the kind of joining process to the upper joint surface of the target area is an "upper convex inclined joining process", and advances to step S335.

In the "upper convex inclined joining process", if the target area is the area 515 located at (row 3, column 5), as illustrated in the upper edges of the left side elevational view and the right side elevational view of the area 515 in FIG. 5C, an "upper convex inclined joint portion" of an upper-oblique convex shape is provided. In more detail, to the upper joint surface of the area 515 divided in step S207 as illustrated in FIG. 5B, the CPU 101 generates an area for addition having a pixel size corresponding to the "upper convex inclined joint portion" of a vertical size of 0.5 and a horizontal size of 1 and distance information that increases downwardly up to the thickness size of 0.5. The CPU 101 adds the area for addition to the area 515 illustrated in FIG. 5B and converts the area 515 into 3D shape data, as will be described hereafter, thereby generating 3D shape data for division printing of the area 515 in which the "upper convex inclined joint portion" has been provided for the upper joint surface. As will be described hereafter with regard to step S344, to the area 510 located at (row 2, column 5) of a fitting partner, a "lower concave inclined joint portion" of an oblique concave shape is provided, as illustrated in the lower edges of the left side elevational view and the right side elevational view in FIG. 5C and is fitted to the "upper convex inclined joint portion" of the upper joint surface of the area 515.

In step S332, the CPU 101 determines whether or not a thickness of upper joint surface of the target area is equal to or greater than a predetermined standard value. If it is equal to or greater than the predetermined standard value, step S334 follows. If NO, that is, if it is less than the predetermined standard value, step S333 follows. For example, the CPU 101 decides a thickness (D6) of upper joint surface of the area 506 located at (row 2, column 1) in FIG. 5C and determines that it is equal to or greater than the predetermined standard value. On the other hand, the CPU 101 decides a thickness (D10) of upper joint surface of the area 510 located at (row 2, column 5) in FIG. 5C and determines that it is less than the predetermined standard value.

In step S333, since the thickness of upper joint surface of the target area is less than the predetermined standard value, the CPU 101 decides that the kind of joining process to the upper joint surface of the target area is an "upper concave inclined joining process", and advances to step S335.

In the "upper concave inclined joining process", if the target area is the area 510 located at (row 2, column 5), as illustrated in the upper edges of the left side elevational view and the right side elevational view of the area 510 in FIG. 5C, an "upper concave inclined joint portion" of an oblique concave shape is provided. In more detail, to the upper joint surface of the area 510 divided in step S207 as illustrated in FIG. 5B, the CPU 101 generates an area for deletion having a pixel size corresponding to the "upper concave inclined joint portion" of a vertical size of 0.5 and a horizontal size of 1 and distance information that decreases downwardly from the thickness size of 0.5. The CPU 101 deletes the area for deletion from the area 510 illustrated in FIG. 5B, and converts the area 510 into 3D shape data, as will be described hereafter, thereby generating 3D shape data for division printing of the area 510 in which the "upper concave inclined joint portion" has been provided for the upper joint surface. As will be described hereafter with regard to step S342, to the area 505 located at (row 1, column 5) of a fitting partner, since a "lower convex inclined joint portion" of a lower-oblique convex shape is provided, as illustrated in the lower edges of the left side elevational view and right side elevational view in FIG. 5C, it is fitted to the "upper convex inclined joint portion" of the upper joint surface of the area 510.

In step S334, since the thickness of upper joint surface of the target area is equal to or greater than the predetermined standard value, the CPU 101 decides that the kind of joining process to the upper joint surface of the target area is an "upper concave half-lap joining process", and advances to step S335.

In the "upper concave half-lap joining process", if the target area is the area 506 located at (row 2, column 1), as illustrated in the upper edges of the left side elevational view and the right side elevational view of the area 506 in FIG. 5C, an "upper concave half-lap joint portion" of a concave shape is provided. In more detail, to the upper joint surface of the area 506 divided in step S207 as illustrated in FIG. 5B, the CPU 101 generates an area for deletion having a pixel size corresponding to the "upper concave half-lap joint portion" of a vertical size of 0.5 and a horizontal size of 2.25 and distance information of a thickness size of 0.5. The CPU 101 deletes the area for deletion from the area 510 illustrated in FIG. 5B, and converts the area 510 into 3D shape data, as will be described hereafter, thereby generating 3D shape data for division printing of the area 510 in which the "upper concave half-lap joint portion" has been provided for the upper joint surface. As will be described hereafter with regard to step S341, to the area 501 located at (row 1, column 1) of a fitting partner, a "lower convex half-lap joint portion" of a downward convex shape is provided, as illustrated in the lower edges of the left side elevational view and the right side elevational view in FIG. 5C and is fitted to the "upper concave half-lap joint portion" of the upper joint surface of the area 506.

In step S335, the CPU 101 determines whether or not the target row of the target area is equal to the divided row number obtained by the division executed in step S207. If it is equal, step S336 follows. If it is not equal, step S337 follows. That is, in step S335, the CPU 101 discriminates whether or not the target area is an area located at (row 3) (lowest side) in the examples of FIGS. 5A to 5D.

In step S336, the CPU 101 decides that the kind of joining process to the lower joint surface of the target area is a "no lower joining process", and advances to step S346. For example, if the target areas are the areas 511 to 515 located at (row 3), since partners to be joined do not exist on the lower joint surface of the areas 511 to 515, the CPU 101 decides that the kind is a "no lower joining process". The lower joint surfaces become flat surfaces as shown in the lower edges of the left side elevational views, the plan views, and the right side elevational views of the areas 511 to 515 in FIG. 5C.

In step S337, the CPU 101 determines whether or not the target column of the target area is equal to (column 1) or the divided column number obtained by the division executed in step S207. If it is equal, step S339 follows. If it is not equal, step S338 follows. That is, the CPU 101 discriminates whether or not the target column of the target area exists in the area located at the first column or the last column in the case in which the target area has been divided into a plurality of areas of the matrix, that is, in the example of FIG. 5B, whether or not the target area is an area located at (column 1) or (column 5).

In step S338, since the target area is not the area located at the first column or the last column, the CPU 101 decides that the kind of joining process to the lower joint surface of the target area is a "lower wavy half-lap joining process", and advances to step S346.

In the "lower wavy half-lap joining process", if the target area is the area 502 located at (row 1, column 2), as illustrated in the lower edge of the plan view of the area 502 in FIG. 5C, a "lower wavy half-lap joint portion" of a sine wave curved shape having both of the concave and convex portions is provided. As mentioned with regard to step S327, an "upper wavy half-lap joint portion" of a sine wave curved shape having both of the concave and convex portions is provided for the upper joint surface of the area 507 of the fitting partner and is fitted to the "lower wavy half-lap joint portion" of the lower joint surface of the area 502. A "lower wavy half-lap joint portion" of a sine wave curved shape provided for the lower joint surface of the area 502 and an "upper wavy half-lap joint portion" of a sine wave curved shape provided for the upper joint surface of the area 507 that faces the area 502 are also illustrated in FIG. 5D. As mentioned above, the joint of the "wavy half-lap joint portion" between the areas 502 and 507 is not performed by the flat-like "grinding joint," but those areas come into engagement and are positioned by the "wavy half-lap joint portions" provided as curved surfaces that vertically cut from the obverse surface to the back surface. Thus, the positions of both areas are difficult to be deviated and those areas are easily joined.

In step S339, the CPU 101 determines whether or not the attribute of the target area is the concave attribute. If it is the concave attribute, step S343 follows. If it is not the concave attribute, step S340 follows.

In step S340, the CPU 101 determines whether or not the thickness of lower joint surface of the target area is equal to or greater than a predetermined standard value. If it is equal to or greater than the predetermined standard value, step S341 follows. If NO, that is, if it is less than the predetermined standard value, step S342 follows. For example, if the target area is the area 501 located at (row 1, column 1), the CPU 101 decides a thickness (D1) of lower joint surface of the area 501 in FIG. 5C and determines that it is equal to or greater than the predetermined standard value. On the other hand, if the target area is the area 505 located at (row 1, column 5), the CPU 101 decides a thickness (d5) of lower joint surface of the area 505 in FIG. 5C and determines that it is less than the predetermined standard value.

In step S341, since the thickness of lower joint surface of the target area is equal to or greater than the predetermined standard value, the CPU 101 decides that the kind of joining process to the lower joint surface of the target area is a "lower convex half-lap joining process", and advances to step S346.

In the "lower convex half-lap joining process", if the target area is the area 501 located at (row 1, column 1), as illustrated in the lower edges of the left side elevational view and the right side elevational view of the area 501 in FIG. 5C, a "lower convex half-lap joint portion" of a downward convex shape is provided. In more detail, to the lower joint surface of the area 501 divided in step S207 as illustrated in FIG. 5B, the CPU 101 generates an area for addition having a pixel size corresponding to the "lower convex half-lap joint portion" of a vertical size of 0.5 and a horizontal size of 2 and distance information of such a thickness size of 0.5. The CPU 101 adds the area for addition to the area 501 in FIG. 5B, converts the area 501 into 3D shape data, as will be described hereafter, and generates 3D shape data for division printing of the area 501 in which the "lower convex half-lap joint portion" has been provided for the lower joint surface.

As mentioned with regard to step S334, to the area 506 located at (row 2, column 1) of a fitting partner, a fitting partner of an upper concave half-lap joint portion is provided as an "upper concave half-lap joint" as illustrated in the upper edges of the left side elevational view and the right side elevational view in FIG. 5C, so that it is fitted to the "lower convex half-lap joint portion" of the bottom surface of the area 501 located at (row 1, column 1). A "lower convex half-lap joint portion" of a downward convex shape provided for the lower joint surface of the area 501 and an "upper concave half-lap joint portion" of a concave shape provided for the upper joint surface of the area 506 which faces the area 501 are also illustrated in FIG. 5D. As mentioned above, the joint of the "half-lap joint portion" between the areas 501 and 506 is not performed by the flat-like "grinding joint," but those areas come into engagement and are positioned by the "half-lap joint portions" provided at the positions of the bottom portions away from the obverse layer, so that the positions are difficult to be deviated and those areas are easily joined.

In step S342, since the thickness of lower joint surface of the target area is less than the predetermined standard value, the CPU 101 decides that the kind of joining process to the lower joint surface of the target area is a "lower convex inclined joining process", and advances to step S346.

In the "lower convex inclined joining process", if the target area is the area 505 located at (row 1, column 5), as illustrated in the lower edges of the left side elevational view and the right side elevational view of the area 505 in FIG. 5C, a "lower convex inclined joint portion" of a lower-oblique convex shape is provided. In more detail, to the lower joint surface of the area 505 divided in S207 as illustrated in FIG. 5B, the CPU 101 generates an area for addition having a pixel size corresponding to the "lower convex inclined joint portion" of a vertical size of 0.5 and a horizontal size of 1 and distance information that increases upwardly up to the thickness size of 0.5. The CPU 101 adds such an area for addition to the area 505 in FIG. 5B, converts the area 505 into 3D shape data, as will be described hereafter, and generates 3D shape data for division printing of the area 505 in which the "lower convex inclined joint portion" has been provided for the lower joint surface.

As mentioned with regard to step S333, to the area 510 located at (row 2, column 5) of a fitting partner, an "upper concave inclined joint portion" of an oblique concave shape is provided, as illustrated in the upper edges of the left side elevational view and the right side elevational view in FIG. 5C and is fitted to the "lower convex inclined joint portion" provided for the lower joint surface of the area 505. A "lower convex inclined joint portion" of a lower-oblique convex shape provided for the lower joint surface of the area 505 and an "upper concave inclined joint portion" of an oblique concave shape provided for the upper joint surface of the area 510 that faces the area 505 are also illustrated in FIG. 5D. As mentioned above, the joint between the areas 505 and 510 is not performed by the flat-like "grinding joint," but those areas come into engagement and are positioned by the "inclined joints" in which an engagement thickness is thin, so that those areas are easily joined.

In step S343, the CPU 101 determines whether or not the thickness of lower joint surface of the target area is equal to or greater than a predetermined standard value. If it is equal to or greater than the predetermined standard value, step S345 follows. If NO, that is, if it is less than the predetermined standard value, step S344 follows. For example, if the target area is the area 506 located at (row 2, column 1), the CPU 101 decides a thickness (d6) of lower joint surface of the area 506 in FIG. 5C, and determines that it is equal to or greater than the predetermined standard value. On the other hand, if the target area is the area 510 located at (row 2, column 5), the CPU 101 decides a thickness (d10) of lower joint surface of the area 510 in FIG. 5C and determines that it is less than the predetermined standard value.

In step S344, since the thickness of lower joint surface of the target area is less than the predetermined standard value, the CPU 101 decides that the kind of joining process to the lower joint surface of the target area is a "lower concave inclined joining process", and advances to step S346.

In the "lower concave inclined joining process", if the target area is the area 510 located at (row 2, column 5), as illustrated in the lower edges of the left side elevational view and the right side elevational view of the area 510 in FIG. 5C, a "lower concave inclined joint portion" of an oblique concave shape is provided. In more detail, to the lower joint surface of the area 510 divided in step S207 as illustrated in FIG. 5B, the CPU 101 generates an area for deletion having a pixel size corresponding to the "lower concave inclined joint portion" of a vertical size of 0.5 and a horizontal size of 1.25 and distance information that decreases upwardly from the thickness size of 0.5. The CPU 101 deletes the area for deletion from the area 510 in FIG. 5B, and converts the area 510 into 3D shape data, as will be described hereafter, thereby generating 3D shape data for division printing of the area 510 in which the "lower concave inclined joint portion" has been provided.

As mentioned with regard to step S331, to the upper joint surface of the area 515 of a fitting partner, an "upper convex inclined joint portion" of an upper-oblique convex shape is provided, as illustrated in the upper edges of the left side elevational view and the right side elevational view in FIG. 5C and is fitted to the "lower concave inclined joint portion" provided for the lower joint surface of the area 510. A "lower concave inclined joint portion" of an oblique concave shape provided for the lower joint surface of the area 510 and an "upper convex inclined joint portion" of an upper-oblique convex shape provided for the upper joint surface of the area 515 that faces the area 510 are also illustrated in FIG. 5D. As mentioned above, the joint between the areas 510 and 515 is not performed by the flat-like "grinding joint," but those areas come into engagement and are positioned by the "inclined joints" in which an engagement thickness is thin, so that those areas are easily joined.

In step S345, since the thickness of lower joint surface of the target area is equal to or greater than the predetermined standard value, the CPU 101 decides that the kind of joining process to the lower joint surface of the target area is a "lower concave half-lap joining process", and advances to step S346.

In the "lower concave half-lap joining process", if the target area is the area 506 located at (row 2, column 1), as illustrated in the lower edges of the left side elevational view and right side elevational view of the area 506 in FIG. 5C, a "lower concave half-lap joint portion" of a concave shape is provided. In more detail, to the lower joint surface of the area 506 divided in step S207 as illustrated in FIG. 5B, the CPU 101 generates an area for deletion having a pixel size corresponding to the "lower concave half-lap joint portion" of a vertical size of 0.5 and a horizontal size of 2 and distance information of such a thickness size of 0.5. The CPU 101 deletes the area for deletion from the area 506 in FIG. 5B, converts the area 506 into 3D shape data, as will be described hereafter, and generates 3D shape data for division printing of the area 506 in which the "lower concave half-lap joint portion" has been provided for the lower joint surface.

As mentioned with regard to step S330, to the area 511 of a fitting partner, an "upper convex half-lap joint portion" of an upward convex shape is provided, as illustrated in the upper edges of the left side elevational view and the right side elevational view in FIG. 5C and is fitted to the "lower concave half-lap joint portion" provided for the lower joint surface of the area 506. A "lower concave half-lap joint portion" of a downward concave shape provided for the lower joint surface of the area 506 and an "upper convex half-lap joint portion" of an upward convex shape provided for the upper joint surface of the area 511 that faces the area 506 are also illustrated in FIG. 5D. As mentioned above, the joint between the areas 506 and 511 is not performed by the flat-like "grinding joint," but those areas come into engagement and are positioned by the "half-lap joint portions" provided at the positions of the bottom portions away from the obverse layers, so that those areas are easily joined.

In step S346, in order to set the target area serving as a target of the discrimination to an area located at the adjacent column, the CPU 101 adds "1" to a value of the current target column and advances to step S347. In step S347, the CPU 101 determines whether or not the value of the current target column is greater than the divided column number obtained by the division performed in step S207. If it is greater, step S348 follows. If it is not greater, step S302 follows. That is, the CPU 101 determines whether or not the discrimination about the kind of joining process has been finished with respect to the area 505, 510, or 515 located at (column 5) in the examples of FIGS. 5A to 5D.

In step S348, in order to set the target area serving as a target of the discrimination to an area located at the next row, the CPU 101 resets the value of the current target column to "1", adds "1" to a value of the current target row, and advances to step S349. In step S349, the CPU 101 determines whether or not the current target row of the discrimination is greater than the divided row number obtained by the division performed in step S207. If it is greater, the processing routine is finished (END). If it is not greater, step S302 follows. That is, the CPU 101 determines whether or not the discrimination about the kind of joining process has been finished with respect to the areas 511 to 515 located at (column 3) in the example of FIG. 5B.

The processes of steps S346 to S349 will be further described with reference to the examples of FIGS. 5A to 5D. First, the CPU 101 determines the kind of joining process to the target area 501 located at the target matrix (target row 1, target column 1) initialized in step S301 (S302 to S345). In step S346, the CPU 101 adds "1" to the value (=1) of the target column. Similarly, the CPU 101 determines the kind of joining process to the areas 502 to 505 located at (target row 1, target column 2) to (target row 1, target column 5) (NO in steps S302 to S346, and S347). If the discrimination about the kind of joining process has been finished with respect to the target area 505, in step S346, the CPU 101 adds "1" to the value (=5) of the target column. Since a resultant value is greater than the divided column number (=5) obtained in step S207 (YES in step S347), in step S348, the CPU 101 sets "1" into the value of the target column and adds "1" to the value (=1) of the target row. Similarly, the CPU 101 determines the kind of joining process to the areas 506 to 515 located at (target row 2, target column 1) to (target row 3, target column 5). If the discrimination about the kind of joining process to the target area 515 has been finished, in step S348, the CPU 101 adds "1" to the value (=3) of the target row. Since a resultant value is greater than the divided column number (=3) obtained in step S207 (YES in step S349), the processing flow is finished.

FIG. 4 is a flowchart for determining the concave/convex attribute of the fitting of the area. In step S401, the CPU 101 determines whether or not the target column of the target area is an even-number column. If it is the even-number column, step S402 follows. If it is not the even-number column, step S404 follows. In step S402, the CPU 101 determines whether or not the target row of the target area is an odd-number row. If it is the odd-number row, step S403 follows. If it is not the odd-number row, step S404 follows. In step S403, the CPU 101 decides that the concave/convex attribute of the target area is the concave attribute, and finishes the process. In step S404, the CPU 101 determines whether or not the target row of the target area is an even-number row. If it is the even-number row, step S403 follows. If it is not the even-number row, step S405 follows. In step S405, the CPU 101 decides that the concave/convex attribute of the target area is the convex attribute, and finishes the process. By setting the attributes in such a manner that the concave attribute and the convex attribute are alternately repeated in the even-number column and the odd-number column and in the even-number row and the odd-number row, as mentioned above, a collision of the fitting shapes of the joint portions provided for the joint surface and the occurrence of the area having a solid shape of an inverse pyramid shape can be prevented.

A description will be made by returning to FIG. 2. In step S210, on the basis of the 3D image data divided into a plurality of areas and the kind of joining process determined to each area, the CPU 101 performs the exchange of the pixel data between the areas and the addition or deletion of the data of the joint portion. Finally, the CPU 101 generates 3D shape data for division printing of the number as many as the number of areas with respect to each area provided with the joint portion, and finishes the process.

The 3D shape data is also called a 3D print file and is a data file of a shape that is described by, for example, stereolithography (STL) format data, virtual reality modeling language (VRML) format data, or the like, and can be used by a 3D molding apparatus (printing device). In the invention, since the fitting shape (joint portion) is added to, or deleted from, the joint surface of each area divided when the 3D image data is converted into the 3D shape data for division printing, there is no limitation in the file format of a conversion destination. In the printing of a 3D relief shape, a vertical/horizontal ratio in the 2-dimensional image directions is generally maintained so that a sense of discomfort of appearance is not caused. As for the depth, however, there is also considered a case in which the conversion from the distance information into thickness information becomes nonlinear like, for example, a logarithmic ratio, in dependence on a degree of emphasis of stereoscopic feeling. Even if the conversion from the distance information into the thickness information becomes nonlinear, however, by determining the kind of joining process on the basis of the thickness information of the joint surface obtained after the conversion and the layout of the areas in the whole region, the fitting shape according to the thickness and the layout can be also similarly determined.

It is determined that the kind of joining process to the joint surfaces of the area 501 are "right convex half-lap joint", "no left joining process", "no upper joining process", and "lower convex half-lap joint". Therefore, as illustrated in FIG. 5D, the area 501 is constructed by flat surfaces (left and upper joint surfaces) and convex surfaces (lower and right joint surfaces). For example, in the case of performing a laminated 3D molding to the area 501, it is sufficient to laminate by setting the plan view side to a vertex.

Similarly, it is determined that the kinds of joining processes to the joint surfaces of the area 502 are "right concave half-lap joint", "left concave half-lap joint", "no upper joining process", and "lower wavy half-lap joint". Therefore, as illustrated in FIG. 5D, the area 502 is constructed by a flat surface (upper joint surface), a curved surface (lower joint surface), and concave surfaces (left and right joint surfaces). For example, in the case of performing a laminated 3D molding to the area 502, it is sufficient to laminate by setting the front view side serving as a curved surface to a vertex.

It is determined that the kinds of joining processes to the joint surfaces of the area 503 are "right convex inclined joint", "left convex half-lap joint", "no upper joining process", and "lower wavy half-lap joint". Therefore, as illustrated in FIG. 5D, the area 503 is constructed by a flat surface (upper joint surface), a curved surface (lower joint surface), and convex surfaces (left and right joint surfaces). For example, in the case of performing a laminated 3D molding to the area 503, it is sufficient to laminate by setting the plan view side to a vertex.

It is determined that the kinds of joining processes to the joint surfaces of the area 504 are "right concave inclined joint", "left concave inclined joint", "no upper joining process", and "lower wavy half-lap joint". Therefore, as illustrated in FIG. 5D, the area 504 is constructed by a flat surface (upper joint surface), a curved surface (lower joint surface), and concave surfaces (left and right joint surfaces). For example, in the case of performing a laminated 3D molding to the area 504, it is sufficient to laminate by setting the front view side of the curved surface to a vertex.

It is determined that the kinds of joining processes to the joint surfaces of the area 505 are "no right joining process", "left convex inclined joint", "no upper joining process", and "lower convex inclined joint". Therefore, as illustrated in FIG. 5D, the area 505 is constructed by flat surfaces (upper and left joint surfaces) and convex surfaces (left and lower joint surfaces). For example, in the case of performing a laminated 3D molding to the area 505, it is sufficient to laminate by setting the plan view side to a vertex.

It is determined that the kinds of joining processes to the joint surfaces of the area 506 are "right wavy half-lap joint", "no left joining process", "upper concave half-lap joint", and "lower concave half-lap joint". Therefore, as illustrated in FIG. 5D, the area 506 is constructed by a flat surface (left joint surface), a curved surface (right joint surface), and concave surfaces (upper and lower joint surfaces). For example, in the case of performing a laminated 3D molding to the area 506, it is sufficient to laminate by setting the right side elevational view side of the curved surface to a vertex.

It is determined that the kinds of joining processes to the joint surfaces of the area 507 are "right wavy half-lap joint", "left wavy half-lap joint", "upper wavy half-lap joint", and "lower wavy half-lap joint". Therefore, as illustrated in FIG. 5D, each joint surface of the area 507 is constructed by a curved surface. For example, in the case of performing a laminated 3D molding to the area 507, it is sufficient to laminate by setting the plan view side of the curved surface to a vertex. This is true of the areas 508 and 509.

It is determined that the kinds of joining processes to the joint surfaces of the area 510 are "no right joining process", "left wavy half-lap joint", "upper concave inclined joint", and "lower concave inclined joint". Therefore, as illustrated in FIG. 5D, the area 510 is constructed by a flat surface (right joint surface), a curved surface (left joint surface), and concave surfaces (upper and lower joint surfaces). For example, in the case of performing a laminated 3D molding to the area 510, it is sufficient to laminate by setting the left side elevational view side of the curved surface to a vertex.

It is determined that the kinds of joining processes to the joint surfaces of the area 511 are "right convex half-lap joint", "no left joining process", "upper convex half-lap joint", and "no lower joining process". Therefore, as illustrated in FIG. 5D, the area 511 is constructed by flat surfaces (left and lower joint surfaces) and convex surfaces (upper and right joint surfaces). For example, in the case of performing a laminated 3D molding to the area 511, it is sufficient to laminate by setting the plan view side of the curved surface to a vertex. Constructions vertically opposite to those of the areas 502 to 504 are similarly applied to the areas 512 to 514, respectively.

It is determined that the kinds of joining processes to the joint surfaces of the area 515 are "no right joining process", "left convex inclined joint", "upper convex inclined joint", and "no lower joining process". Therefore, as illustrated in FIG. 5D, the area 515 is constructed by flat surfaces (right and lower joint surfaces) and convex surfaces (upper and left joint surfaces). For example, in the case of performing a laminated 3D molding to the area 515, it is sufficient to laminate by setting the plan view side to a vertex.

As mentioned above, according to the embodiment, the original 3D image data is divided into a plurality of areas and the vertical/horizontal sizes including the fitting shape (joint portion) of each of the divided areas are set so as to lie within the specification (maximum print size) of the printing device 110. Since the kind (half-lap joint or inclined joint) of fitting shape is set in accordance with the comparison between the thickness of joint surface of each area and the predetermined standard value, there are such advantages that, when the areas are joined, they are easily positioned and the positions are difficult to be deviated. Since the kind (concave/convex attribute) adapted to provide the fitting shape is decided in accordance with the position of the target area among all of the plurality of divided areas so as not to become the inverse pyramid shape, there is such an advantage that even by the laminated molding apparatus, the 3D image data can be converted into the 3D shape data that can be molded. If the dividing line appearing in the obverse layer of each area is determined so that the joint boundary is inconspicuous and the "joint portion" is provided at the position of the bottom portion of each area as illustrated in FIG. 5D, there is also such an advantage that both of a good appearance of the surface layer and the improvement of use convenience upon joining operation can be accomplished.

Second Embodiment

The second embodiment of the invention relates to a dividing method of 3D image data in which distance information has been added to 2D image information every pixel. In the embodiment, the 3D image data is divided into a plurality of areas on the basis of the specification (maximum print size) of the printing device and is converted into 3D shape data for division printing provided with the convex or concave tongue-and-groove joint portion on the basis of lengths of sides of the joint surface of each area and the position of the target area among all of the plurality of areas.

Figure 6:
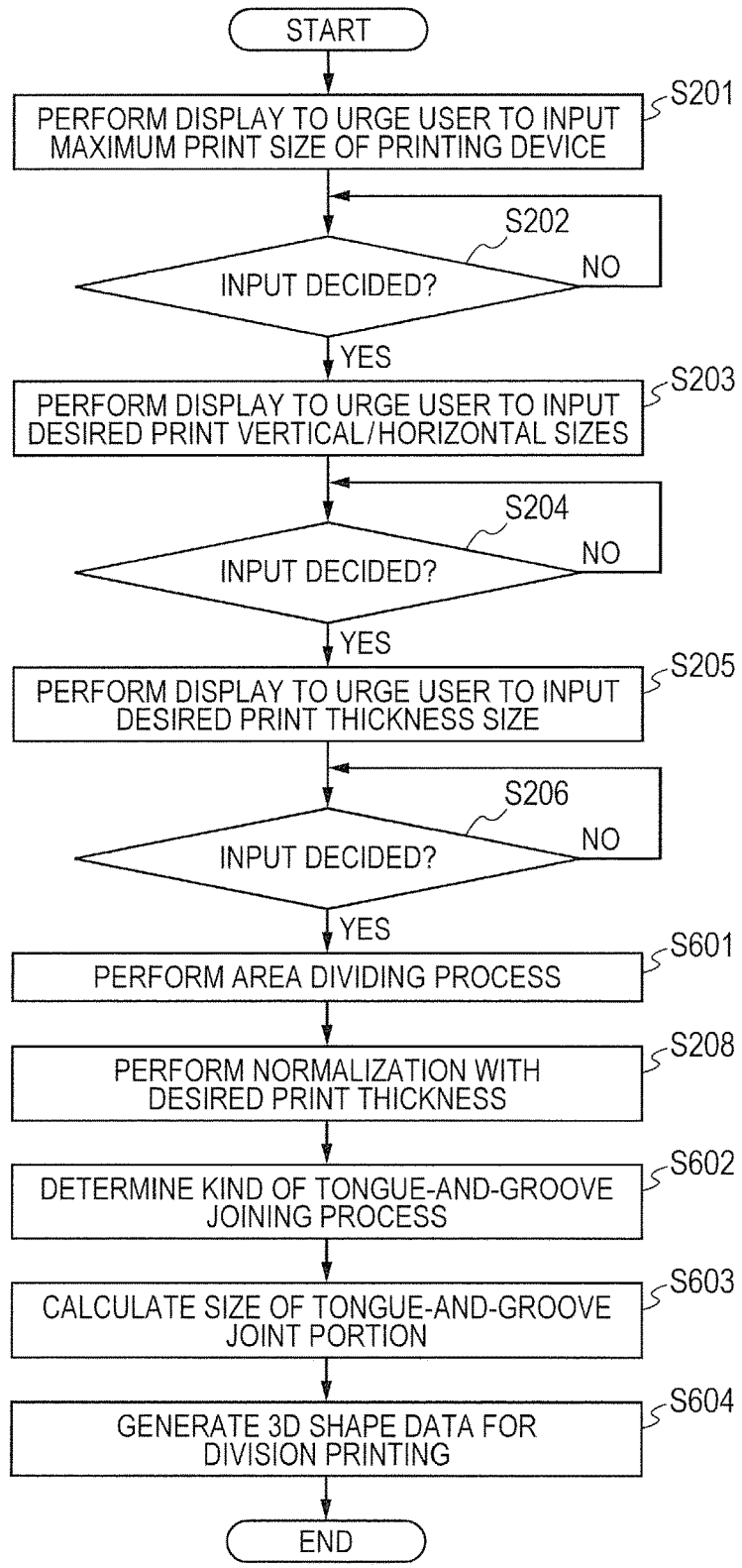
FIG. 6 is a flowchart for describing a generation of 3D shape data for division printing according to the second embodiment.
Figures 7, 7A:
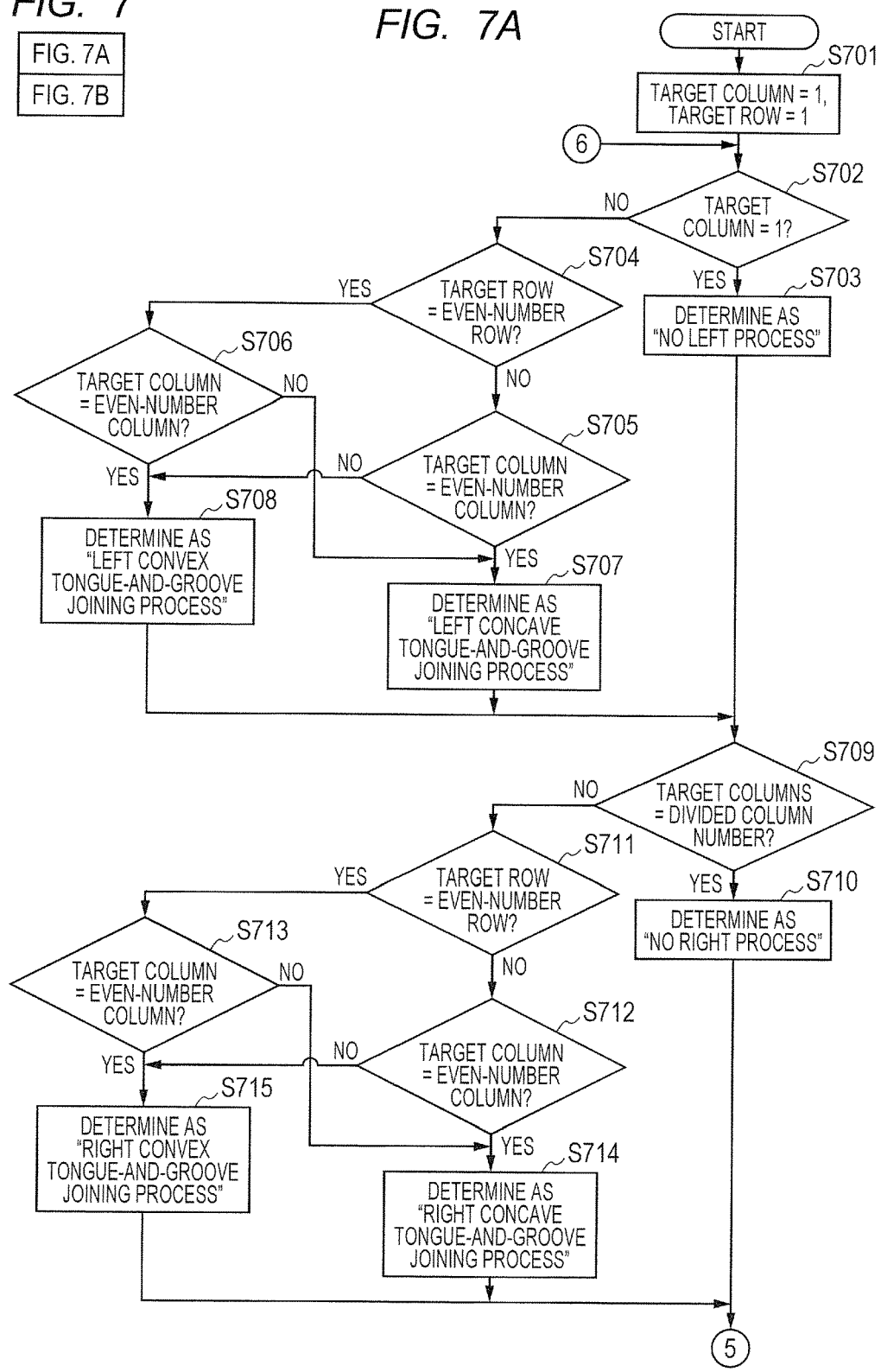
FIG. 7, which is composed of FIGS. 7A and 7B, is a flowchart for describing a determination of a kind of tongue-and-groove joining process according to the second embodiment.
Figure 7B:
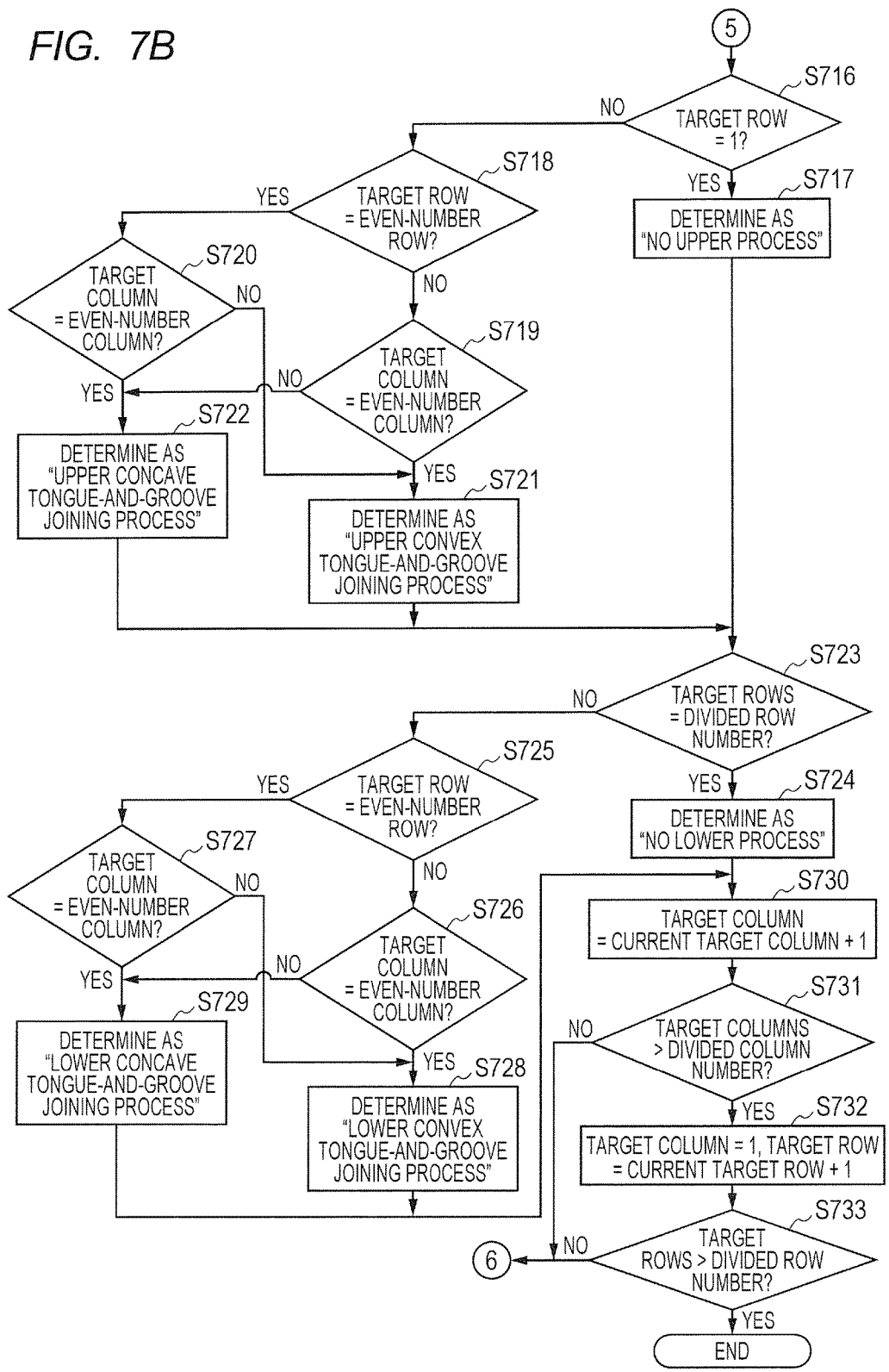

FIG. 6 is a flowchart for generating 3D shape data for division printing of the area provided with a tongue-and-groove joint portion. FIG. 7 is a flowchart for determining the kind of tongue-and-groove joining process. FIGS. 8A to 8D are conceptual diagrams illustrating divided areas and shapes of tongue-and-groove joint portions provided in the areas. FIGS. 6 to 8D will now be described together with FIG. 1. Since steps S201 to S206 and step S208 in FIG. 6 are similar to those in the foregoing description regarding FIG. 2, their description is omitted here.

In step S601, the CPU 101 executes an area dividing process so that each area lies within the maximum print size of the printing device in consideration of an increase in size of each area that is caused by providing a tongue-and-groove joint portion, and advances to step S208.

FIG. 8A is an example of vertical/horizontal maximum print sizes of the printing device and it is now assumed that those sizes are equal to (vertical size 3)×(horizontal size 3). FIG. 8B is an example of a result in which the original 3D image data has been divided into a plurality of areas 801 to 815 in accordance with desired vertical/horizontal print sizes that were input in step S203. In this example, the CPU 101 regards that a maximum increase size of each area that is caused by providing the tongue-and-groove joint portion is equal to 1, and sets one area obtained after the area dividing process in step S601 into sizes within (vertical size 2)×(horizontal size 2). FIG. 8B is the example in which on the basis of (vertical size 6)×(horizontal size 9) of the desired vertical/horizontal print sizes, which were input in step S203, the 3D image data matched with the user's desired sizes has eventually been divided into the fifteen areas 801 to 815 arranged in a matrix form of three rows and five columns. In this manner, the area dividing process is executed in such a manner that each area provided with the tongue-and-groove joint portion lies within the maximum print sizes of the printing device 110.

In step S602, the CPU 101 determines the kind of tongue-and-groove joining process on the basis of the position of the target area every divided area, and advances to step S603. The determining process of the kind of tongue-and-groove joining process will be described in detail with reference to FIG. 7.

FIG. 7 is a flowchart for determining the kind of tongue-and-groove joining process to the joint surface of the target area. First, in step S701, the CPU 101 initializes the target column and the target row of the target area into "1" and advances to step S702. The target area at the time of initialization is the upper-left-most area 801 in FIG. 8B.

In step S702, the CPU 101 determines whether or not the target column of the target area is (column 1). If it is (column 1), step S703 follows. If it is not (column 1), step S704 follows. That is, in step S702, the CPU 101 determines whether or not the target area is the area located at (column 1) (that is, leftmost side) in the examples of FIGS. 8A to 8D. In step S703, the CPU 101 decides that the kind of tongue-and-groove joining process to the left joint surface of the target area is a "no left process", and advances to step S709.

Now, FIG. 8C is an example of orthogonal projection diagrams of 3D shapes subjected to the tongue-and-groove joining process. Each orthogonal projection diagram is constructed by the following five faces: that is, a plan view (shown at a center) serving as an obverse surface upon printing; a rear view (shown on the upper position); a front view (shown on the lower side); a right side elevational view (shown on the right side); and a left side elevational view (shown on the left side). The layout of the areas 801 to 815 corresponds to the layout of FIG. 8B.

If the target areas are the areas 801, 806, and 811 located at (row 1, column 1), (row 2, column 1), and (row 3, column 1), since partners to be joined do not exist on the left joint surfaces of the target areas, it is decided that the kind of tongue-and-groove joining process is a "no left process". Therefore, as illustrated in the left edges of the rear views, plan views, and front views of those areas in FIG. 8C, the left joint surfaces become flat surfaces.

In step S704, the CPU 101 determines whether or not the target row of the target area is an even-number row. If it is the even-number row, step S706 follows. If it is the odd-number row, step S705 follows. In step S705, the CPU 101 determines whether or not the target column of the target area is an even-number column. If it is the even-number column, step S707 follows. If it is the odd-number column, step S708 follows. In step S706, the CPU 101 determines whether or not the target column of the target area is an even-number column. If it is the even-number column, step S708 follows. If it is the odd-number column, step S707 follows.

In step S707, since the target area is located at (odd-number row, even-number column) or (even-number row, odd-number column), the CPU 101 decides that the kind of tongue-and-groove joining process to the left joint surface of the target area is a "left concave tongue-and-groove joining process", and advances to step S709.

In the "left concave tongue-and-groove joining process", if the target area is the area 802 located at (row 1, column 2), as illustrated in the left edge of the plan view of the area 802 in FIG. 8C, a "left concave tongue-and-groove joint portion" of a concave shape is provided at the center of the left joint surface. In more detail, to the center of the left joint surface of the divided area 802 illustrated in FIG. 8B, a pixel size corresponding to the "left concave tongue-and-groove joint portion" having a horizontal size of 0.5 and a vertical size of 0.5 is moved to the left adjacent area 801, and a new dividing line is defined between the areas 801 and 802. Thus, the "left concave tongue-and-groove joint portion" having an engagement effect of the tongue-and-groove joint portion is provided for the left joint surface of the divided area 802. In step S715, as will be described later, to the area 801 of the fitting partner, as illustrated in the right edge of the plan view of FIG. 8C, a "right convex tongue-and-groove joint portion" of a convex shape is provided at the center of the right joint surface and is fitted to the "left concave tongue-and-groove joint portion" provided for the left joint surface of the divided area 802.

FIG. 8D is an example of oblique projection diagrams of 3D shapes of the areas provided with the tongue-and-groove joining processing portion. Each oblique projection diagram is a projection surface in which faces corresponding to the front view, the plan view, and the right side elevational view of FIG. 8C are seen, and a layout of the areas corresponds to that of FIG. 8B. If the target area is the area 802 located at (row 1, column 2), since the tongue-and-groove joint surface is provided in such a direction that the area is vertically cut from the obverse surface to the back surface of the area 802, there is no limitation of the minimum thickness necessary for the joint portion. For example, to the area 802 in FIG. 8B, pixel components corresponding to the tongue-and-groove joint portion are moved to the left adjacent area 801 or the right adjacent area 803. At the same time, by moving pixel components of the tongue-and-groove joint portion to the relevant area from the lower-adjacent area located at (row 2, column 2) and defining a resultant area as an area of the new dividing line, a divided area surrounded by the dividing lines added with the engagement effect of the tongue-and-groove joint portion is formed. If the foregoing new divided area is converted into the 3D shape data, as will be described later, the tongue-and-groove joint portion is provided and the 3D shape data for division printing of the relevant area added with the engagement effect is formed.

In step S708, since the target area is located at (even-number row, even-number column) or (odd-number row, odd-number column), the CPU 101 decides that the kind of tongue-and-groove joining process to the left joint surface of the target area is a "left convex tongue-and-groove joining process", and advances to step S709.

In the "left convex tongue-and-groove joining process", if the target area is the area 803 located at (row 1, column 3), as illustrated in the left edge of the plan view of the area 803 in FIG. 8C, a "left convex tongue-and-groove joint portion" of a convex shape is provided. To the center of the left joint surface of the area 803 in FIG. 8B, a pixel size corresponding to the "left convex tongue-and-groove joint portion" having a horizontal size of 0.5 and a vertical size of 0.5 is fetched from the left adjacent area 802 and is defined as an area of a new dividing line, so that a dividing line added with the engagement effect of the tongue-and-groove joint portion is formed. In step S714, as will be described hereafter, to the area 802 of the fitting partner, as illustrated in the right edge of the plan view of FIG. 8C, a "right concave tongue-and-groove joint portion" of a concave shape is provided and is fitted to the "left convex tongue-and-groove joint portion" provided for the left joint surface of the area 803.

In step S709, the CPU 101 determines whether or not the target column of the target area is equal to the divided column number obtained by the division executed in step S607. If it is equal, step S710 follows. If it is not equal, step S711 follows. That is, the CPU 101 discriminates whether or not the target area is an area located at (column 5) (rightmost side) in the examples of FIGS. 8A to 8D.

In step S710, since the target column of the target area is equal to the divided column number obtained by the division executed in step S607, the CPU 101 decides that the kind of tongue-and-groove joining process to the right joint surface of the target area is a "no right process", and advances to step S716. For example, if the target areas are the areas 805, 810, and 815, since partners to be joined do not exist on the right joint surfaces of the areas 805, 810, and 815, the CPU 101 decides that the kind is a "no right process". The right joint surface becomes a flat surface as shown in the right edges of the rear view, the plan view, and the front view of the relevant area in FIG. 8C.

In step S711, the CPU 101 determines whether or not the target row of the target area is equal to an even-number row. If it is equal to the even-number row, step S713 follows. If it is the odd-number row, step S712 follows. In step S712, the CPU 101 discriminates whether or not the target column of the target area is equal to the even-number column. If it is equal to the even-number column, step S714 follows. If it is equal to the odd-number column, step S715 follows. In step S713, the CPU 101 determines whether or not the target column of the target area is equal to the even-number column. If it is equal to the even-number column, step S715 follows. If it is equal to the odd-number column, step S714 follows.

In step S714, since the target area is located at (odd-number row, even-number column) or (even-number row, odd-number column), the CPU 101 decides that the kind of tongue-and-groove joining process to the right joint surface of the target area is a "right concave tongue-and-groove joining process", and advances to step S716.

In the "right concave tongue-and-groove joining process", if the target area is the area 802 located at (row 1, column 2), as illustrated in the right edge of the plan view of the area 802 in FIG. 8C, a "right concave tongue-and-groove joint portion" of a concave shape having a horizontal size of 0.5 and a vertical size of 0.5 is provided at the center of the right joint surface. In step S708, as mentioned above, to the area 803 of the fitting partner, as illustrated in the plan view of the area 803, since a "left convex tongue-and-groove joint portion" is provided for the left joint surface, it is fitted to the "left concave tongue-and-groove joint portion" of the right joint surface of the area 802.

As illustrated in FIG. 8D, a "right concave tongue-and-groove joint portion" of a concave shape is provided for the right joint surface of the area 802 and is fitted to the "left convex tongue-and-groove joint portion" of a convex shape provided for the left joint surface of the area 803 that faces the area 802. As mentioned above, the joint between the areas 802 and 803 is not performed by the flat-like "grinding joint portion," but those areas come into engagement and are positioned by the "tongue-and-groove joint portion" provided as a cross section adapted to vertically cut the areas from the obverse surfaces to the back surfaces of the areas 802 and 803, so that their positions are difficult to be deviated and those areas are easily joined. In a manner similar to the first embodiment, it can be regarded that the areas 801, 803, 805, 807, 809, 811, 813, and 815 have the convex attribute of the tongue-and-groove joint portion and the areas 802, 804, 806, 808, 810, 812, and 814 have the concave attribute of the tongue-and-groove joint portion.

In step S715, since the target area is located at (even-number row, even-number column) or (odd-number row, odd-number column), the CPU 101 decides that the kind of tongue-and-groove joining process to the right joint surface of the target area is a "right convex tongue-and-groove joining process", and advances to step S716.

In the "right convex tongue-and-groove joining process", if the target area is the area 801 located at (row 1, column 1), as illustrated in the right edge of the plan view of the area 801 in FIG. 8C, a "right convex tongue-and-groove joint portion" of a convex shape is provided. In step S707, as mentioned above, to the left joint surface of the area 802 of the fitting partner, as illustrated in the left edge of the plan view of the area 802, a "left concave tongue-and-groove joint portion" of a concave shape is provided and is fitted to the "right convex tongue-and-groove joint portion" provided for the right joint surface of the area 801.

As illustrated in FIG. 8D, a "right convex tongue-and-groove joint portion" of a convex shape is provided for the right joint surface of the area 801, is fitted to the "left concave tongue-and-groove joint portion" of a concave shape provided for the left joint surface of the area 802 that faces the area 801, and comes into engagement and is positioned by the "tongue-and-groove joint portion". Therefore, the positions of the areas 801 and 802 are difficult to be deviated and those areas are easily joined.

In step S716, the CPU 101 determines whether or not the target row of the target area is equal to (row 1). If it is equal to (row 1), step S717 follows. If it is not equal to (row 1), step S718 follows.

In step S717, the CPU 101 determines that the kind of tongue-and-groove joining process to the upper joint surface of the target area is a "no upper process", and advances to step S723. If the target areas are located at (row 1, column 1) to (row 1, column 5), since partners to be joined do not exist on the upper joint surfaces of the target areas, the CPU 101 decides that the kind of tongue-and-groove joining process is a "no upper process". Therefore, as illustrated in the upper edges of the left side elevational views, the plan views, and the right side elevational views of the areas 801 to 805 in FIG. 8C, the upper joint surfaces become flat surfaces.

In step S718, the CPU 101 determines whether or not the target row of the target area is equal to an even-number row. If it is equal to the even-number row, step S720 follows. If it is the odd-number row, step S719 follows. In step S719, the CPU 101 discriminates whether or not the target column of the target area is equal to the even-number column. If it is equal to the even-number column, step S721 follows. If it is equal to the odd-number column, step S722 follows. In step S720, the CPU 101 determines whether or not the target column of the target area is equal to the even-number column. If it is equal to the even-number column, step S722 follows. If it is equal to the odd-number column, step S721 follows.

In step S721, since the target area is located at (odd-number row, even-number column) or (even-number row, odd-number column), the CPU 101 decides that the kind of tongue-and-groove joining process to the upper joint surface of the target area is an "upper convex tongue-and-groove joining process", and advances to step S723.

In the "upper convex tongue-and-groove joining process", if the target area is the area 806 located at (row 2, column 1), as illustrated in the upper edge of the plan view of the area 806 in FIG. 8C, an "upper convex tongue-and-groove joint portion" of a convex shape having a horizontal size of 0.5 and a vertical size of 0.5 is provided at the center. In step S729, as will be described hereafter, to the lower joint surface of the area 801 of the fitting partner, as illustrated in the plan view of the area 801, a "lower concave tongue-and-groove joint portion" of a center concave shape is provided and is fitted to the "upper convex tongue-and-groove joint portion" provided for the upper joint surface of the area 806.

In step S722, since the target area is located at (even-number row, even-number column) or (odd-number row, odd-number column), the CPU 101 decides that the kind of tongue-and-groove joining process to the upper joint surface of the target area is an "upper concave tongue-and-groove joining process", and advances to step S723.

In the "upper concave tongue-and-groove joining process", if the target area is the area 807 located at (row 2, column 2), as illustrated in the upper edge of the plan view of the area 807 in FIG. 8C, an "upper concave tongue-and-groove joint portion" of a concave shape having a horizontal size of 0.5 and a vertical size of 0.5 is provided at the center. In step S728, as will be described hereafter, to the lower joint surface of the area 802 of the fitting partner, as illustrated in the lower edge of the plan view of the area 802, a "lower convex tongue-and-groove joint portion" of a convex shape is provided and is fitted to the "upper concave tongue-and-groove joint portion" provided for the upper joint surface of the area 807.

In step S723, the CPU 101 determines whether or not the target row of the target area is equal to the divided row number obtained by the division performed in step S607. If it is equal, step S724 follows. If it is not equal, step S725 follows. That is, in step S723, the CPU 101 determines whether or not the target area is an area located at (row 3) (lowest side) in the examples of FIGS. 8A to 8D.

In step S724, the CPU 101 decides that the kind of tongue-and-groove joining process to the lower joint surface of the target area is a "no lower process", and advances to step S730. If the target areas are located at (row 3, column 1) to (row 3, column 5), since partners to be joined do not exist on the lower joint surfaces of the target areas, the CPU 101 decides that the kind of tongue-and-groove joining process is a "no lower process". Therefore, as illustrated in the lower edges of the left side elevational views, the plan views, and the right side elevational views of the areas 811 to 815 in FIG. 8C, the lower joint surfaces become flat surfaces.

In step S725, the CPU 101 determines whether or not the target row of the target area is equal to an even-number row. If it is equal to the even-number row, step S727 follows. If it is the odd-number row, step S726 follows. In step S726, the CPU 101 determines whether or not the target column of the target area is equal to the even-number column. If it is equal to the even-number column, step S728 follows. If it is equal to the odd-number column, step S729 follows. In step S727, the CPU 101 determines whether or not the target column of the target area is equal to the even-number column. If it is equal to the even-number column, step S729 follows. If it is equal to the odd-number column, step S728 follows.

In step S728, since the target area is located at (odd-number row, even-number column) or (even-number row, odd-number column), the CPU 101 decides that the kind of tongue-and-groove joining process to the lower joint surface of the target area is a "lower convex tongue-and-groove joining process", and advances to step S730.

In the "lower convex tongue-and-groove joining process", if the target area is the area 802 located at (row 1, column 2), as illustrated in the lower edge of the plan view of the area 802 in FIG. 8C, a "lower convex tongue-and-groove joint portion" of a convex shape having a horizontal size of 0.5 and a vertical size of 0.5 is provided at the center. In step S722, as mentioned above, to the upper joint surface of the area 807 of the fitting partner, as illustrated in the upper edge of the plan view of the area 807, an "upper concave tongue-and-groove joint portion" of a concave shape is provided and is fitted to the "lower convex tongue-and-groove joint portion" provided for the lower joint surface of the area 802.

As illustrated in FIG. 8D, a "lower convex tongue-and-groove joint portion" of a convex shape is provided for the lower joint surface of the area 802 and comes into engagement and is positioned by the "upper concave tongue-and-groove joint portion" of a concave shape and the "tongue-and-groove joint" provided for the upper joint surface of the area 807 that faces the area 802, so that the positions are difficult to be deviated and those areas are easily joined.

In step S729, since the target area is located at (even-number row, even-number column) or (odd-number row, odd-number column), the CPU 101 decides that the kind of tongue-and-groove joining process to the lower joint surface of the target area is a "lower concave tongue-and-groove joining process", and advances to step S730.

In the "lower concave tongue-and-groove joining process", if the target area is the area 801 located at (row 1, column 1), as illustrated in the lower edge of the plan view of the area 801 in FIG. 8C, a "lower concave tongue-and-groove joint portion" of a concave shape having a horizontal size of 0.5 and a vertical size of 0.5 is provided at the center. In step S721, as mentioned above, to the upper joint surface of the area 806 of the fitting partner, as illustrated in the plan view of the area 806, an "upper convex tongue-and-groove joint portion" of a convex shape is provided and is fitted to the "lower concave tongue-and-groove joint portion" provided for the lower joint surface of the area 801.

As illustrated in FIG. 8D, a "lower concave tongue-and-groove joint portion" of a concave shape is provided for the lower joint surface of the area 801 and comes into engagement and is positioned by the "upper convex tongue-and-groove joint portion" and the "tongue-and-groove joint" provided for the upper joint surface of the area 806 that faces the area 801, so that the positions are difficult to be deviated and those areas are easily joined.

In step S730, the CPU 101 adds "1" to a value of the target column of the target area and advances to step S731. In step S731, the CPU 101 determines whether or not the target column of the target area is greater than the divided column number obtained by the division executed in step S607. If it is greater, step S732 follows. If it is not greater, step S702 follows. That is, the CPU 101 determines whether or not the discrimination about the kind of tongue-and-groove joining process has been finished up to the areas located at (column 5) illustrated in FIG. 8B.

In step S732, since the target column of the target area is greater than the divided column number obtained by the division executed in step S607, the CPU 101 resets the target column of the target area into (column 1), adds "1" to the target row, and advances to step S733. In step S733, the CPU 101 determines whether or not the target row of the target area is greater than the divided row number obtained by the division executed in step S607. If it is greater, the process is finished. If it is not greater, step S702 follows. That is, the CPU 101 determines whether or not the discrimination about the kind of tongue-and-groove joining process has been finished up to the areas located at (row 3) illustrated in FIG. 8B.

Returning to a description of FIG. 6, in step S603, the CPU 101 calculates a size of "tongue-and-groove joint portion" on the basis of lengths of sides of the joint surfaces of the areas 801 to 815 divided in step S601, and advances to step S604. For example, in FIG. 8C, such a size is assumed to be pixels of the vertical/horizontal sizes of ¼ of the length of side of the joint surface of each of the areas 801 to 815. If the target area is the area 805 located at (row 1, column 5), a size of "tongue-and-groove joint portion" of the left joint surface is set to a vertical size of 0.5 and a horizontal size of 0.5, and a size of "tongue-and-groove joint portion" of the lower joint surface is set to a vertical size of 0.25 and a horizontal size of 0.25.

In step S604, to the joint surfaces of the areas 801 to 815 divided based on the 3D image data, between the areas, the CPU 101 moves and exchanges the pixels corresponding to the kind of tongue-and-groove joining process decided in FIG. 7 and the size of "tongue-and-groove joint portion" calculated in step S603. To each area, the CPU 101 generates 3D shape data for division printing and finishes the process.

Although the example in which the lengths of joint surfaces of the adjacent areas are equal has been mentioned with regard to the embodiment, there is also a case in which the user wants to join a plurality of divided areas to one joint surface. In such a case, a size of "tongue-and-groove joint portion" based on the length of a side of the short area of the joint surface is calculated and is decided from the position in the whole layout of such an area in such a manner that the individual concave and convex attributes do not overlap, and a plurality of tongue-and-groove joint portions may be provided for the joint surface of the area on the side that is joined to the plurality of areas. As illustrated in FIG. 8D, each joint surface of the areas 801 to 815 is constructed by a flat surface and concave and convex surfaces perpendicular to the back surface. For example, in the case of performing the laminated 3D molding by the printing device, it is sufficient to laminate the joint surfaces by using the obverse surface (that is, on the plan view side) as a vertex.

As mentioned above, in the embodiment, the 3D image data is divided into a plurality of areas in such a manner that the vertical/horizontal sizes are equal to sizes that are printable in the maximum print size of the printing device 110, while including the fitting shape according to the tongue-and-groove joint portion. Since the fitting shape (tongue-and-groove joint portion) is provided based on the position of the target area among all of the areas and the lengths of sides of the joint surfaces, when the printed models of the areas are joined, they can be easily positioned and their positions are difficult to be deviated. Thus, there is such an advantage that the printed models can be easily assembled merely by arranging them in dividing order.

Other Embodiments

Embodiments of the present invention can also be realized by a computer of a system or an apparatus that reads out and executes computer-executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer-executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™) a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A print data dividing apparatus comprising:
   (A) a memory that stores instructions; and
   (B) at least one processor operatively coupled to the memory, and configured to execute the instructions to function as:
      (a) a dividing unit configured to divide three-dimensional (3D) image data, having image information and distance information, into a plurality of areas;
      (b) a determining unit configured to determine a kind of a shape of a joint surface of a target area, among the plurality of areas, on the basis of (i) a position of the target area among all of the plurality of areas, and (ii) a thickness of the target area having the joint surface, the determining unit determining the kind of the shape of the joint surface of the target area such that the shape has a concave/convex portion and the joint surface is fitted to another joint surface of another area, of the plurality of areas, that is adjacent to the target area, and, on the basis of the thickness of the target area having the joint surface, the determining unit is further configured to determine that a joining process of joining the joint surface to the other joint surface to form a model is one of a half-lap joining process and an inclined joining process; and
      (c) a generating unit configured to generate 3D shape data for division printing of the target area in which a joint portion, corresponding to the determined kind of the shape of the joint surface, has been provided for the joint surface.

2. The print data dividing apparatus according to claim 1, wherein the at least one processor further executes the instructions to function as (d) an inputting unit configured to input a maximum print size of a printing device, connected to the print data dividing apparatus, and a desired print size of the model, to be formed by joining a plurality of printed portions using the printing device,
   wherein a size of the target area having the joint surface provided with the joint portion lies within a range of the maximum print size, and a size of the model, to be formed by joining the plurality of printed portions that are formed by the printing device on the basis of the 3D shape data for division printing and are related to the plurality of areas, corresponds to the desired print size.

3. The print data dividing apparatus according to claim 1, wherein, between the other area that is adjacent to the target area through the joint surface and the target area, the generating unit mutually exchanges pixel data corresponding to the joint portion, thereby generating the 3D shape data for division printing regarding the target area in which the joint portion has been provided for the joint surface.

4. The print data dividing apparatus according to claim 1, wherein the generating unit generates one of an area for addition and an area for deletion having a pixel size corresponding to the joint portion, and adds distance information of a thickness size of the joint portion to the target area, in a case in which the area for addition is generated, and deletes distance information of the thickness size of the joint portion, in a case in which the area for deletion is generated, thereby generating the 3D shape data for division printing of the target area in which the joint portion has been provided for the joint surface.

5. The print data dividing apparatus according to claim 1, wherein the determining unit determines that the kind of the joining process of joining the joint surface to the other joint surface is a half-lap joining process in a case in which the thickness of the target area having the joint surface is equal to or greater than a predetermined value, and that the kind of the joining process of joining the joint surface to the other joint surface is the inclined joining process in a case in which the thickness of the target area having the joint surface is less than the predetermined value.

6. The print data dividing apparatus according to claim 1, wherein the joint portion is a tongue-and-groove joint portion, and a size of the tongue-and-groove joint portion is calculated on the basis of a length of a side of the joint surface.

7. The print data dividing apparatus according to claim 1, wherein the position of the target area, among all of the plurality of areas, is expressed by using a matrix constructed by a target row and a target column, and the determining unit:
   determines that the kind of the joining process for the joint surface having no area that faces the joint surface of the target area is no joining process,
   determines that the kind of the joining process for the joint surface of the target area is a wavy half-lap joining process in a case in which the target row is not equal to either one of (row 1) or a divided row number, and the target column is not equal to either one of (column 1) or a divided column number, and
   determines that the kind of the joining process for the joint surface of the target area is one of the half-lap joining process and the inclined joining process on the basis of the thickness of the joint surface in a case in which the target row is equal to either one of the (row 1) or the divided row number, or the target column is equal to either one of the (column 1) or the divided column number.

8. The print data dividing apparatus according to claim 1, wherein each of the plurality of areas has a concave/convex attribute indicating a concave/convex state of the joint portion, and the adjacent areas have different concave/convex attributes.

9. A program for causing a computer to execute a print data dividing method comprising:

a step of dividing three-dimensional (3D) image data, having image information and distance information, into a plurality of areas;

a step of determining a kind of a shape of a joint surface of a target area, among the plurality of areas, on the basis of (i) a position of the target area among all of the plurality of areas, and (ii) a thickness of the target area having the joint surface, wherein the kind of the shape of the joint surface of the target area is determined such that the shape has a concave/convex portion and the joint surface is fitted to another joint surface of another area, of the plurality of areas, that is adjacent to the target area;

a step of determining, on the basis of the thickness of the target area having the joint surface, that a joining process of joining the joint surface to the other joint surface to form a model is a half-lap joining process and an inclined joining process; and a step of generating 3D shape data for division printing of the target area in which a joint portion corresponding to the determined kind of the shape of the joint surface has been provided for the joint surface.

10. A non-transitory computer-readable recording medium storing a program for causing a computer to execute a print data dividing method, the method comprising:

a step of dividing three-dimensional (3D) image data, having image information and distance information, into a plurality of areas;

a step of determining a kind of a shape of a joint surface of a target area among the plurality of areas, on the basis of (i) a position of the target area among all of the plurality of areas, and (ii) a thickness of the target area having the joint surface, wherein the kind of the shape of the joint surface of the target area is determined such that the shape has a concave/convex portion and the joint surface is fitted to another joint surface of another area, of the plurality of areas, that is adjacent to the target area;

a step of determining, on the basis of the thickness of the target area having the joint surface, that a joining process of joining the joint surface to the other joint surface to form a model is a half-lap joining process and an inclined joining process; and a step of generating 3D shape data for division printing of the target area in which a joint portion corresponding to the determined kind of the shape of the joint surface has been provided for the joint surface.

* * * * *